US011812066B2

(12) United States Patent
Bordes et al.

(10) Patent No.: US 11,812,066 B2
(45) Date of Patent: Nov. 7, 2023

(54) METHODS, DEVICES AND STREAM TO ENCODE GLOBAL ROTATION MOTION COMPENSATED IMAGES

(71) Applicant: INTERDIGITAL VC HOLDINGS, INC., Wilmington, DE (US)

(72) Inventors: Philippe Bordes, Laille (FR); Gagan Rath, Rennes (FR); Fabien Racape, Rennes (FR); Franck Galpin, Thorigne-Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 1060 days.

(21) Appl. No.: 16/338,475

(22) PCT Filed: Sep. 21, 2017

(86) PCT No.: PCT/EP2017/073906
§ 371 (c)(1),
(2) Date: Mar. 30, 2019

(87) PCT Pub. No.: WO2018/060048
PCT Pub. Date: Apr. 5, 2018

(65) Prior Publication Data
US 2020/0045342 A1 Feb. 6, 2020

(30) Foreign Application Priority Data

Sep. 30, 2016 (EP) ..................................... 16306266

(51) Int. Cl.
*H04N 19/85* (2014.01)
*H04N 19/176* (2014.01)
(Continued)

(52) U.S. Cl.
CPC ........... *H04N 19/85* (2014.11); *H04N 19/176* (2014.11); *H04N 19/527* (2014.11); *H04N 19/61* (2014.11)

(58) Field of Classification Search
CPC .... H04N 19/176; H04N 19/527; H04N 19/61; H04N 19/85
See application file for complete search history.

(56) References Cited

U.S. PATENT DOCUMENTS 5,430,480 A * 7/1995 Allen ................. H04N 5/23267
348/208.4
5,844,613 A 12/1998 Chaddha
(Continued)

FOREIGN PATENT DOCUMENTS

| CN | 1568015 A | 1/2005 |
|---|---|---|
| CN | 1906948 A | 1/2007 |

(Continued)

OTHER PUBLICATIONS

Choi, B. "Draft Version of Omnidirectional Media Application Format (OMAF) WD", International Organisation For Standardisation Organisation Internationale De Normalisation ISO/IEC JTC1/SC29/WG11 Coding Of Moving Pictures And Audio, May 2016.

(Continued)

*Primary Examiner* — Jessica M Prince

(57) ABSTRACT

The present disclosure relates to methods, apparatus or systems for encoding and decoding sequence of images by applying a global rotation motion compensation to an input image. According to different embodiments, the input image is a reference image in a compression loop or the image to be encoded. The images to encode are omnidirectional images. As a result, applying a global rotation motion compensation to them corresponds to generate new images as if they have been captured according to a different front (Continued)

direction. When this new front direction is the one of a reference image, the compensation of apparent motion is facilitated.

8 Claims, 14 Drawing Sheets

(51) Int. Cl.
    *H04N 19/527*     (2014.01)
    *H04N 19/61*     (2014.01)

(56) References Cited

U.S. PATENT DOCUMENTS

| | | | |
|---|---|---|---|
| 8,374,244 B2* | 2/2013 | Lee | H04N 19/61 375/240.14 |
| 10,104,361 B2* | 10/2018 | Budagavi | H04N 19/46 |
| 2017/0324951 A1* | 11/2017 | Raveendran | H04N 13/344 |
| 2018/0007389 A1* | 1/2018 | Izumi | G06T 9/001 |
| 2018/0061011 A1* | 3/2018 | Kim | G06T 7/30 |
| 2018/0063540 A1* | 3/2018 | Zhu | H04N 19/54 |
| 2019/0174116 A1* | 6/2019 | Oh | H04N 13/194 |
| 2020/0068222 A1 | 2/2020 | Tsukagoshi | |

FOREIGN PATENT DOCUMENTS

| | | |
|---|---|---|
| CN | 1939066 A | 3/2007 |
| CN | 101350920 | 1/2009 |
| EP | 1578135 | 9/2005 |
| JP | 2005020478 A | 1/2005 |
| JP | 2007523525 A | 8/2007 |
| JP | 2009081622 A | 4/2009 |
| KR | 20050092306 A | 9/2005 |
| WO | 2005099275 A2 | 10/2005 |
| WO | 2018056181 A1 | 3/2018 |

OTHER PUBLICATIONS

Takahashi et al, "Study on a Lossless Coding of Digital Museum Image Using Rotation Compensation", P-5.19, pp. 105-106, The Proceedings of the 17th Picture Coding Symposium of Japan, Nov. 13, 2002 (3 pages).

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Oct. 2014, pp. 1-540.

Jin Guoxin, et, al., "Motion estimation and compensation for fisheye warped video" 10.1109/ICIP.2015.7351303. 2015, pp. 2751-2755.

Rath, G.B, et. al., "Iterative least squares and compression based estimations for a four-parameter linear global motion model and global motion compensation" Circuits and Systems for Video Technology, IEEE Transactions vol. 9 No. 7. Oct. 1999, pp. 1075-1099.

Ahn, Jaewoo, et. al., "VirtualQWERTY: Textual Communication in Virtual Reality" In: Bebis G. et al. (eds) Advances in Visual Computing. ISVC 2006. Lecture Notes in Computer Science, vol. 4292. Springer, Berlin, Heidelberg pp. 79-87.

Jiang, K, et. at., "Compression of cubic-panorama datasets with spatially consistent representation" 2006 IEEE International Workshop on Haptic Audio Visual Environments and their Applications (HAVE 2006), Ottawa, Ont., 2006, pp. 111-116.

Anonymous, "Proposed Revised Requirements for a Future Video Coding Standard draft v.2", International Organisation For Standardisation Organisation Internationale De Normalisation ISO/IEC JTC 1/SC 29/WG 11 Coding of Moving Pictures and Audio, ISO/IEC JTC1/SC29/WG11 M36183, Jun. 2015.

Anonymous, "Advanced video coding for generic audiovisual services", International Telecommunication Union, ITU-T Telecommunication Standardization Sector of ITU, Series H: Audiovisual and Multimedia Systems, Infrastructure of audiovisual services—Coding of moving video, Recommendation ITU-T H.264, Jan. 2012, pp. 1-630.

Chen, Ke "Expanding Line Search for Panorama Motion Estimation" 2009 11th IEEE International Symposium on Multimedia, San Diego, CA, 2009, pp. 577-582.

Jiang, Kehua, "Cubic-Panorama Image Dataset Compression for Image-Based Virtual Environment Navigation" [Doctoral Thesis]. University of Ottawa, 2009. pp. 1-221.

Krum, Daivd M. et. al., "Tablet-based interaction panels for immersive environments," 2014 IEEE Virtual Reality (VR), Minneapolis, MN, 2014, pp. 91-92.

Krutz, A. et al., "Tool Experiment 3: Inter Prediction in HEVC" Joint Collaborative Team on Video Coding (JCT-VC) of ITU-T SG16 WP3 and ISO/IEC JTC1/SC29/WG11, 1st Meeting: Dresden, DE, 2010, pp. 1-11.

\* cited by examiner

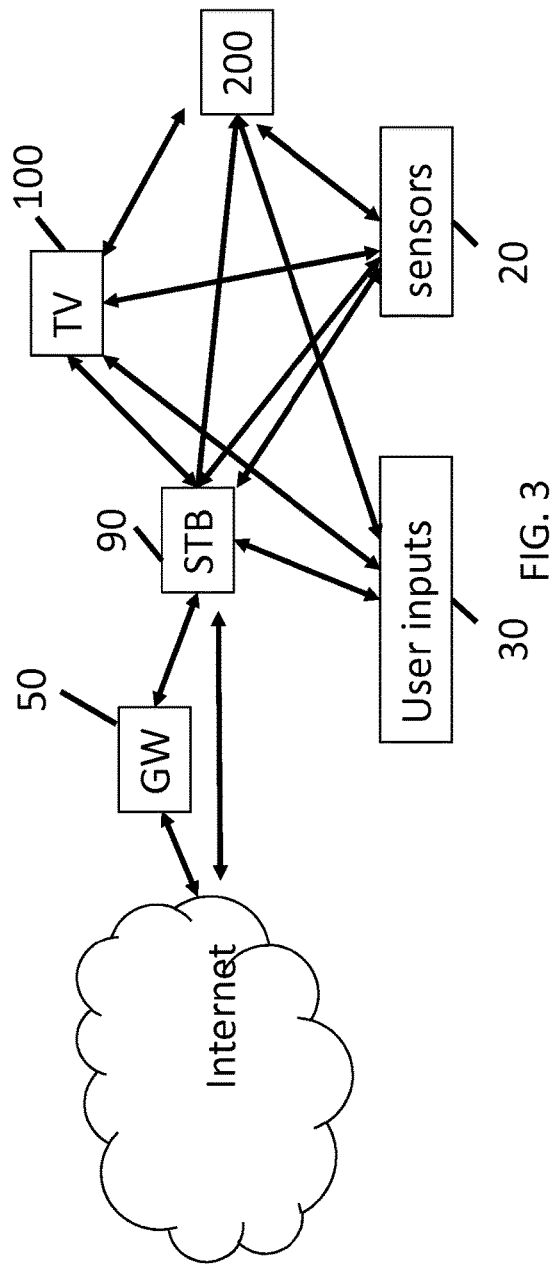
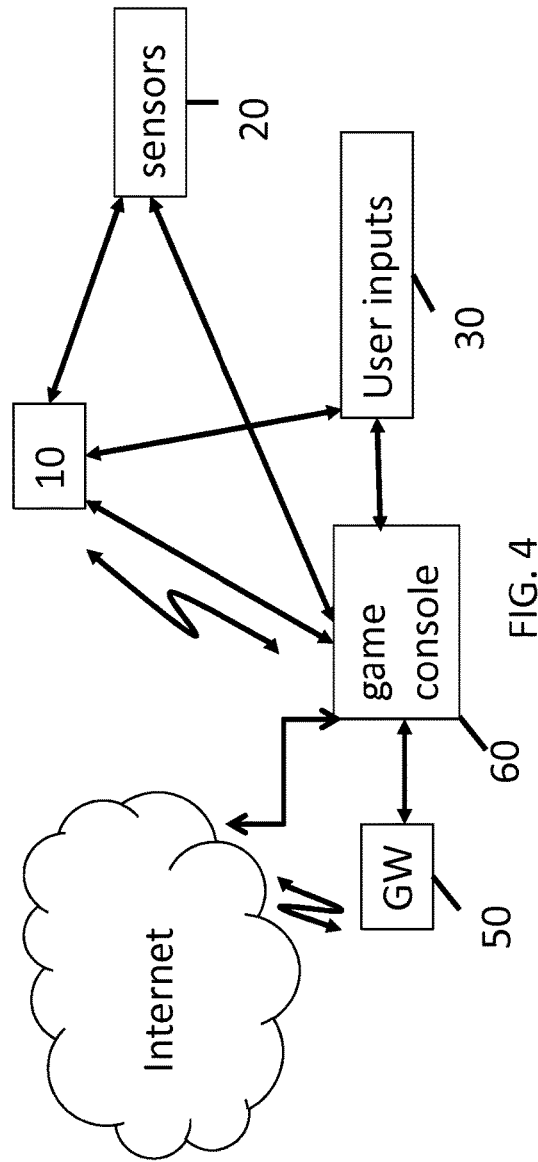
FIG. 3
FIG. 4

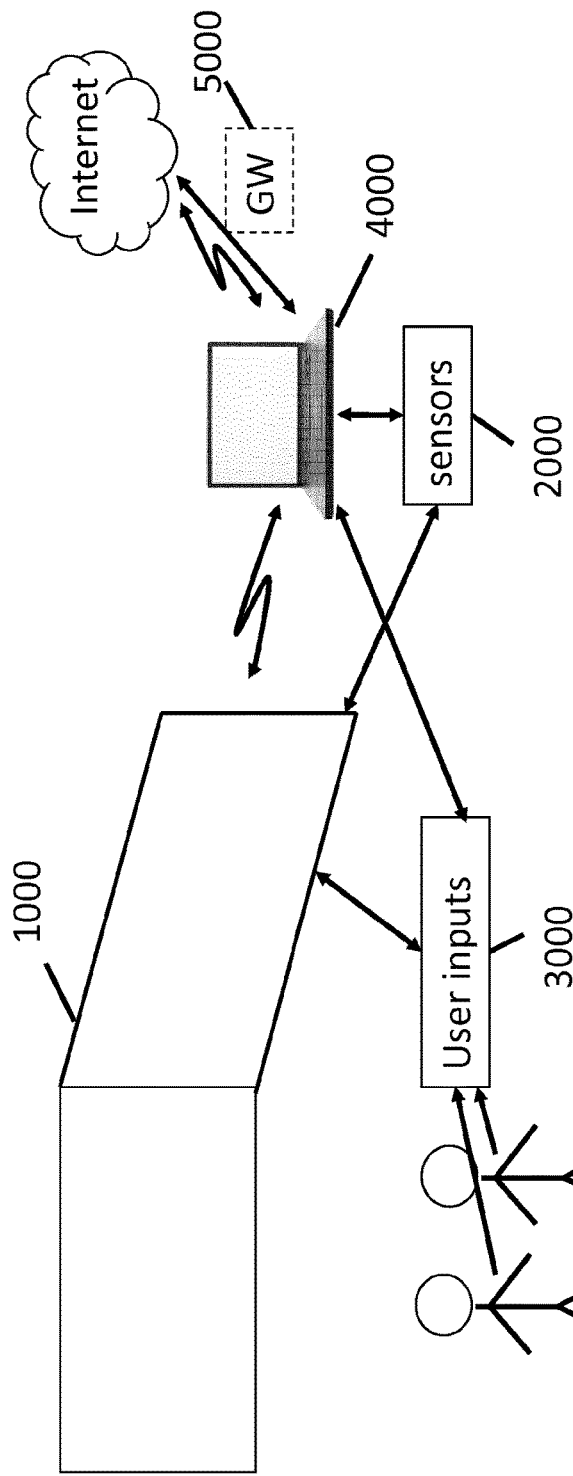
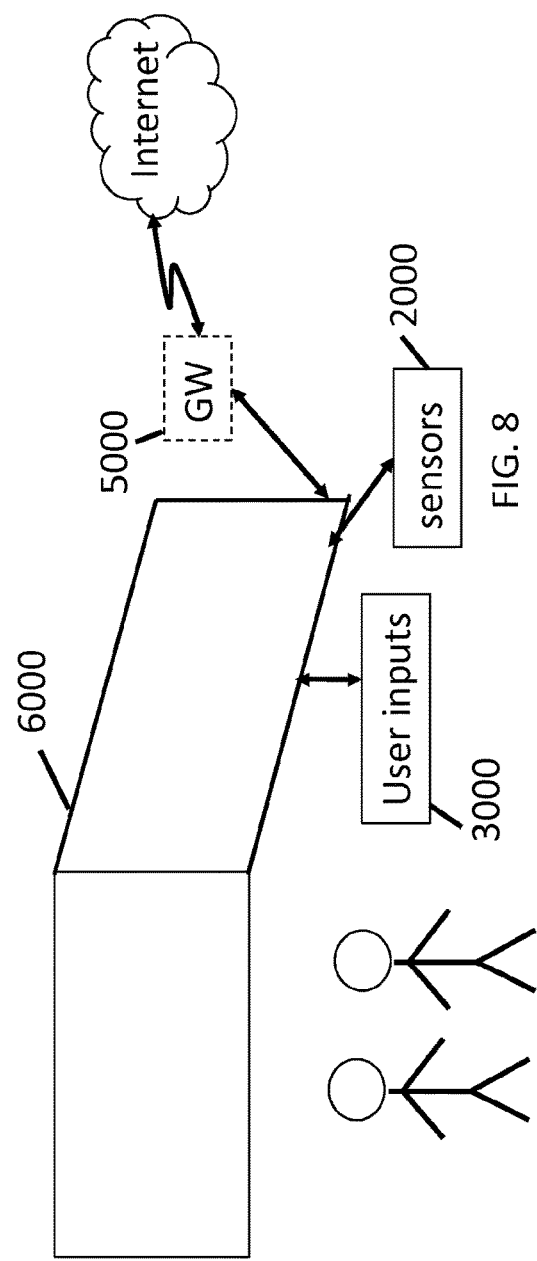

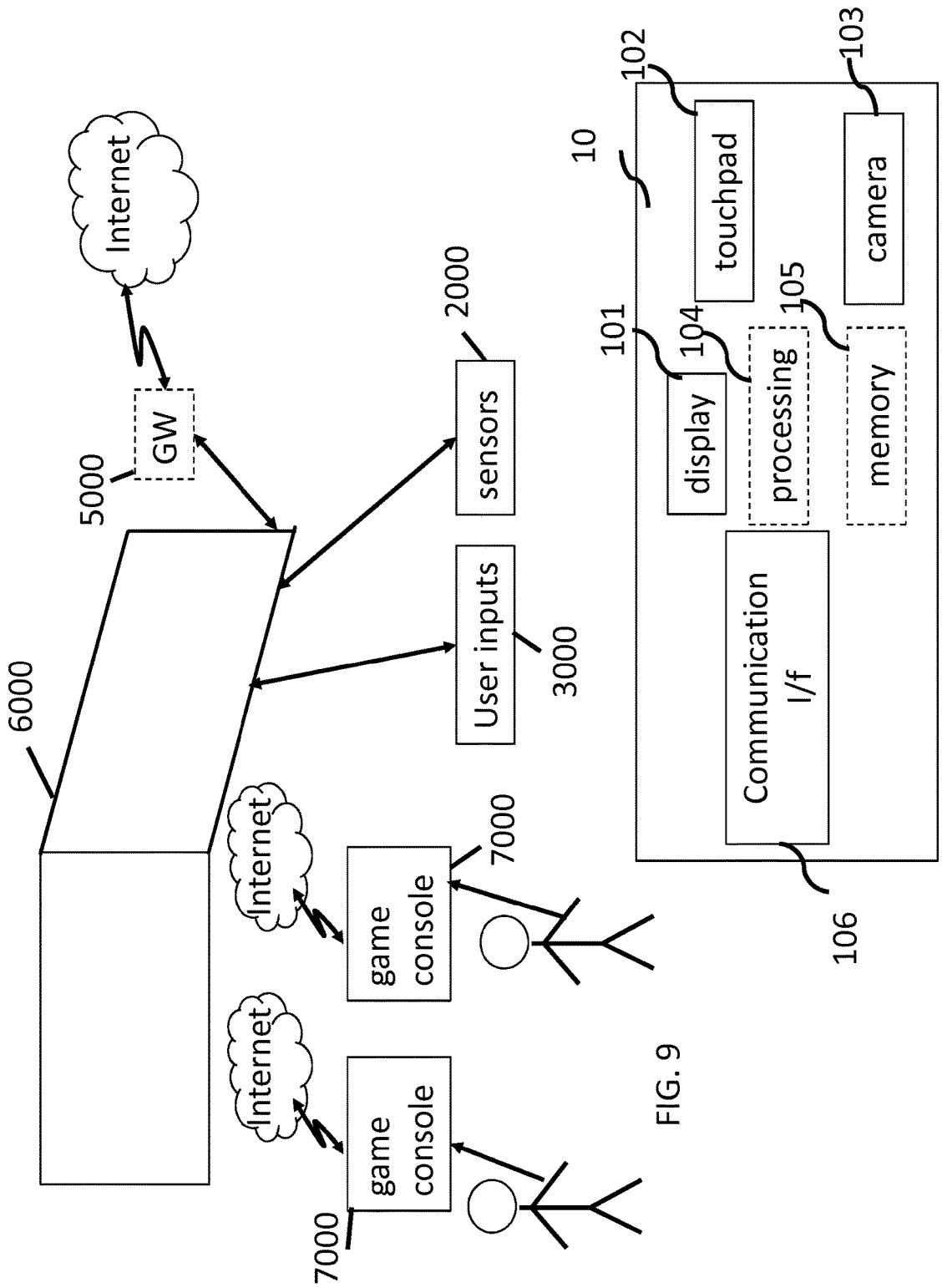

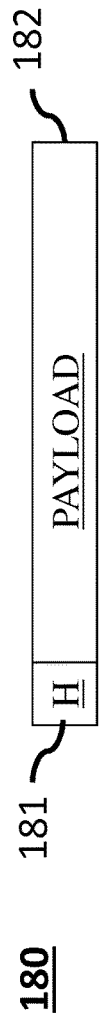
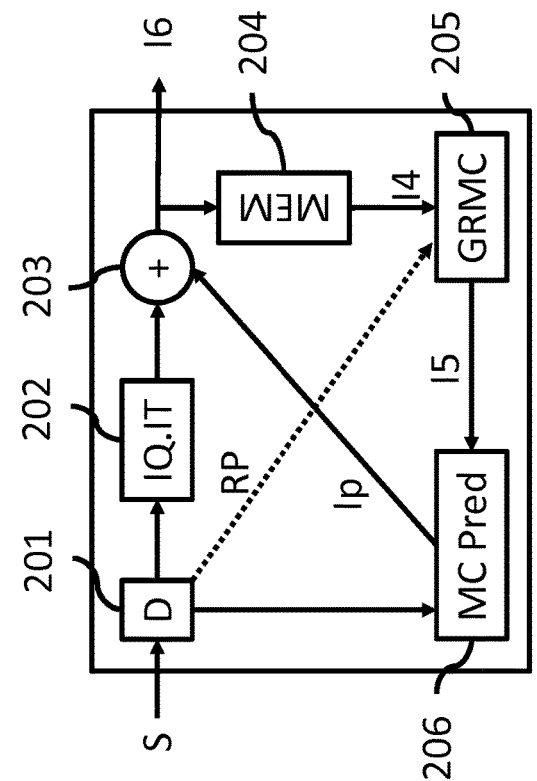
FIG. 18
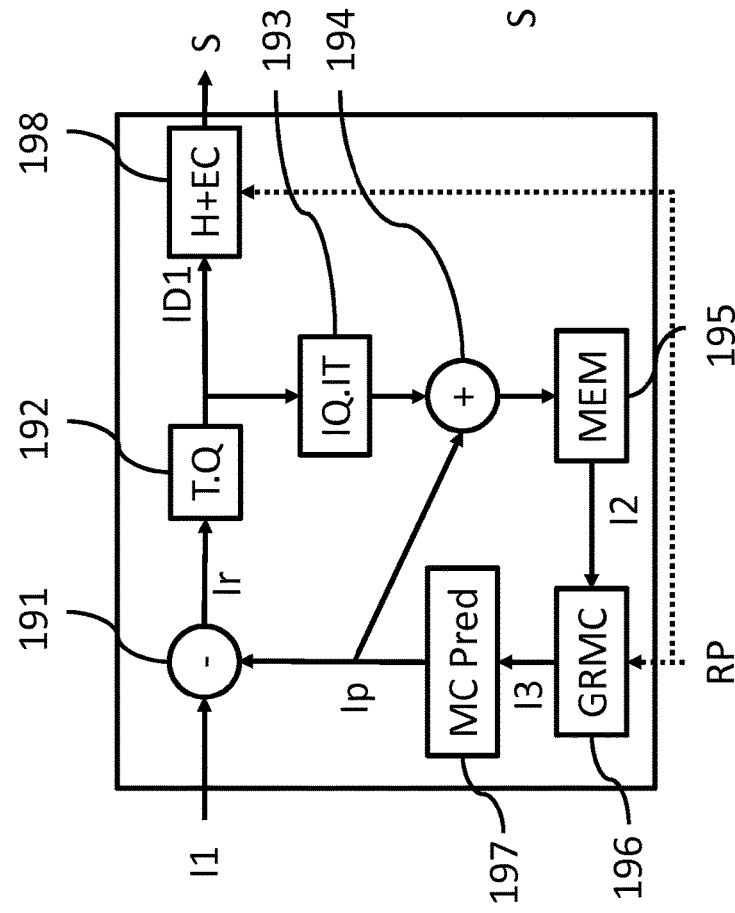
FIG. 19
FIG. 20

METHODS, DEVICES AND STREAM TO ENCODE GLOBAL ROTATION MOTION COMPENSATED IMAGES

CROSS-REFERENCE TO RELATED APPLICATIONS

This application is a national stage application under 35 U.S.C. § 371 of International Application PCT/EP2017/073906, filed Sep. 21, 2017, which was published in accordance with PCT Article 21(2) on Apr. 5, 2018, in English and which claims the benefit of European patent application no. EP16306266.4, filed Sep. 30, 2016.

1. TECHNICAL FIELD

The present disclosure relates to the domain of encoding motion compensation in immersive videos for example when such immersive videos are processed in a system for virtual reality, augmented reality or augmented virtuality and for instance when displayed in a head mounted display device.

2. BACKGROUND

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

3. SUMMARY

According to an aspect of the present principle, the present disclosure relates to a method of encoding a first image of a sequence of images in a stream. The method comprises:
  obtaining a second image by applying a global rotation motion compensation according to rotation parameters to a third image. The third image is obtained by processing the first image at a step of a compression process; and
  encoding the first image and the associated rotation parameters in the stream by using the second image as an input image of a motion compensation module.

According to a particular characteristic, the third image is the first image, so, the global rotation motion compensation is applied directly on the first image at the input of the compression loop.

According to a specific embodiment, the third image is obtained from said first image, during the compression process, by obtaining a residual image responsive to the input first image; obtaining a motion predicted image responsive to the first image; and wherein the third image is a reconstructed image obtained by summing the residual image to the motion predicted image.

The present disclosure also relates to a method of decoding a first image of a sequence of images from a stream. The method comprises:
  obtaining a second image and associated rotation parameters associated from the stream; and
  decoding the first image by applying a global rotation motion compensation according to said rotation parameters to a third image. The third image is an output image of a motion compensation module obtained from the second image during a decompression process.

According to a particular characteristic, the third is the decoded first image, so the global motion rotation is applied to the decoded image at the output of the decompression loop.

According to a specific embodiment, the third image is obtained by obtaining a residual image responsive to the second image; obtaining a motion predicted image responsive to the second image; and wherein the third image is a reconstructed image obtained by summing the residual image to the motion predicted image during the decompression process.

The present disclosure also relates to a bit stream carrying data representative of a sequence of images. The data comprise:
  A first element of syntax representative of the sequence of images; and
  A second element of syntax representative of parameters of a parametric global rotation motion associated with an identifier of at least one image of the sequence of images.

The present disclosure also relates to a device for encoding a first image of a sequence of images in a stream. The device comprising a memory associated with at least a processor configured to:
  obtain a second image by applying a global rotation motion compensation according to rotation parameters to a third image. The third image is obtained by processing the first image at a step of a compression process; and
  encode the first image and associated rotation parameters in the stream by using the second image as an input image of a motion compensation module.

According to a specific embodiment, the third image is said first image, so, the global rotation motion compensation is applied directly on the first image at the input of the compression loop.

According to a specific embodiment, the third image is obtained, during the decompression process, from the first image by obtaining a residual image responsive to the first image; obtaining a motion predicted image responsive to the first image; and wherein the third image is a reconstructed image obtained by summing the residual image to the motion predicted image.

The present disclosure also relates to a device for decoding a first image of a sequence of images from a stream. The device comprises a memory associated with at least a processor configured to:
  obtain a second image and associated rotation parameters from the stream; and
  decode the first image by applying a global rotation motion compensation according to said rotation parameters to a third image. The third image is an output image of a motion compensation module and is obtained from the second image at a step during a decompression process.

4. LIST OF FIGURES

The present disclosure will be better understood, and other specific features and advantages will emerge upon reading the following description, the description making reference to the annexed drawings wherein:

FIG. 3 represents a first embodiment of a system, according to a particular embodiment of the present principles;

FIG. 4 represents a first embodiment of a system, according to a particular embodiment of the present principles;

FIG. 7 represents a first embodiment of a system, according to a particular embodiment of the present principles;

Figure 11:
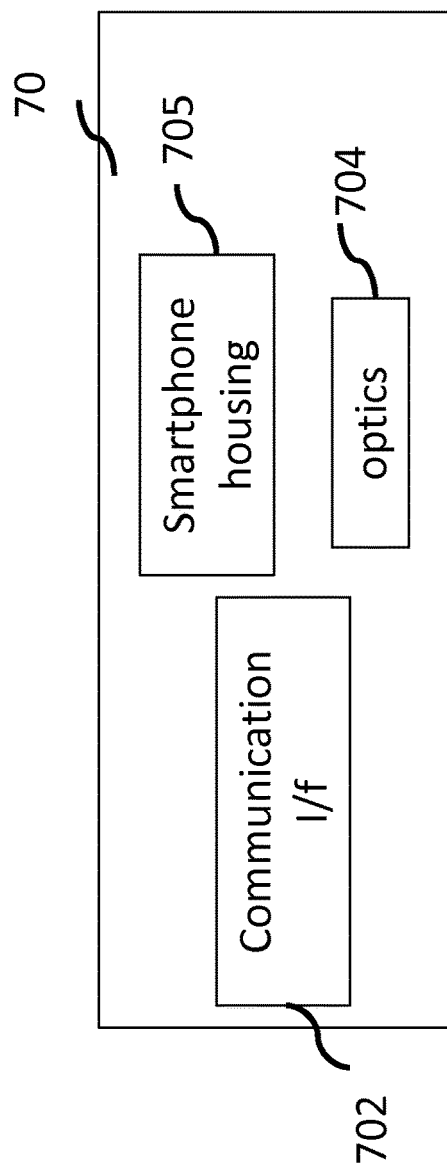
Figure 12:
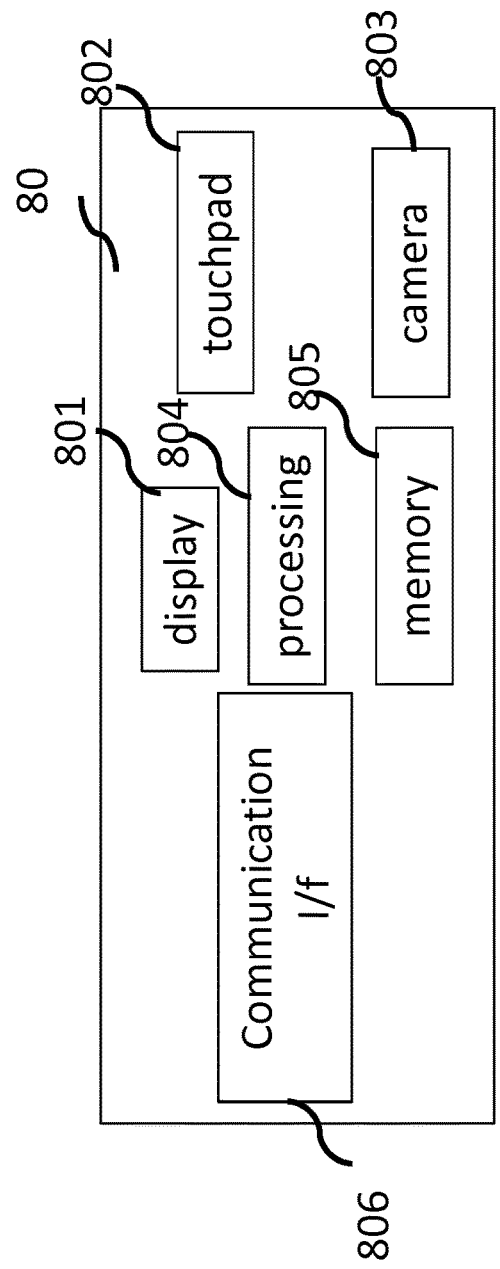
Figure 13:
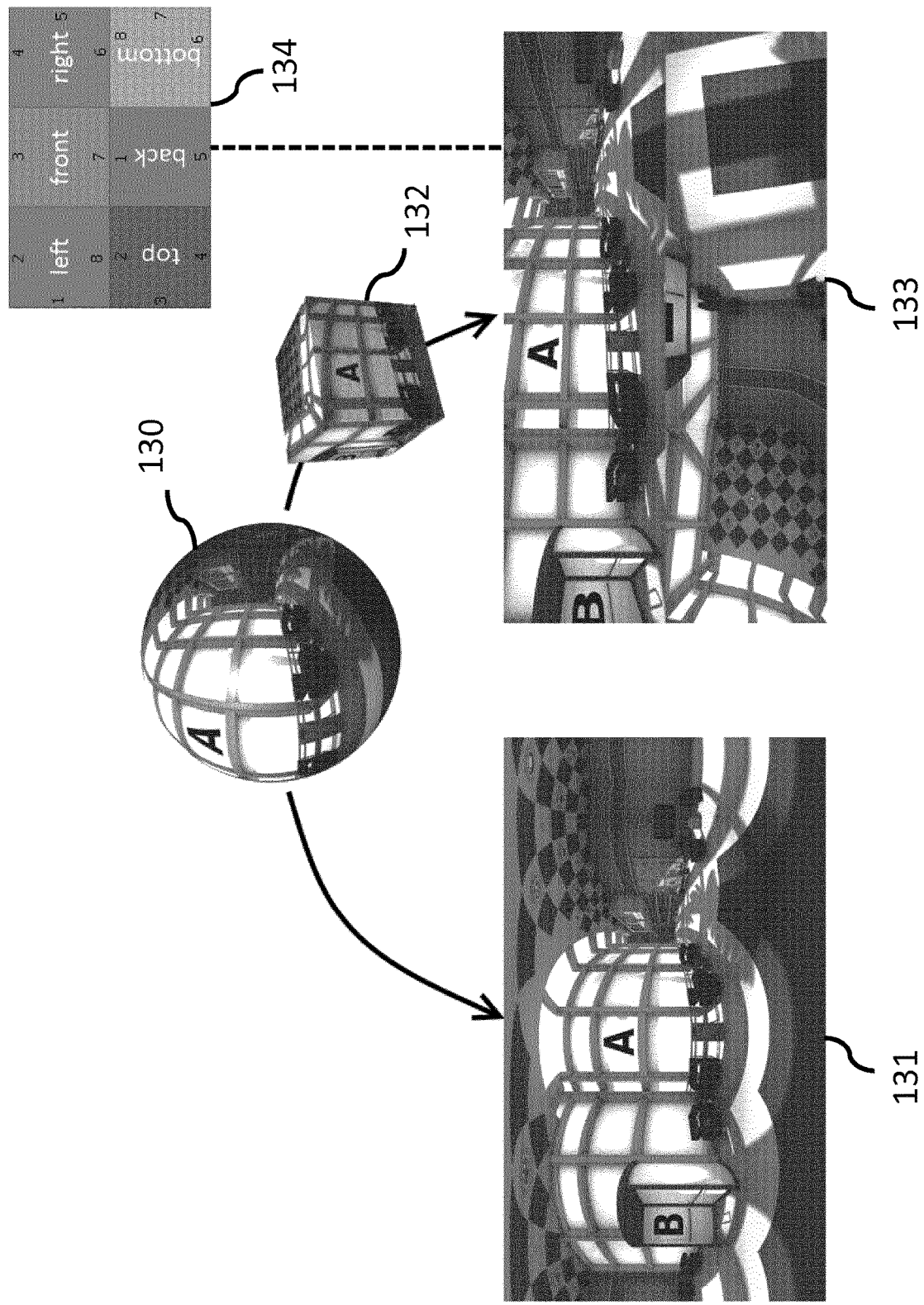
Figure 14:
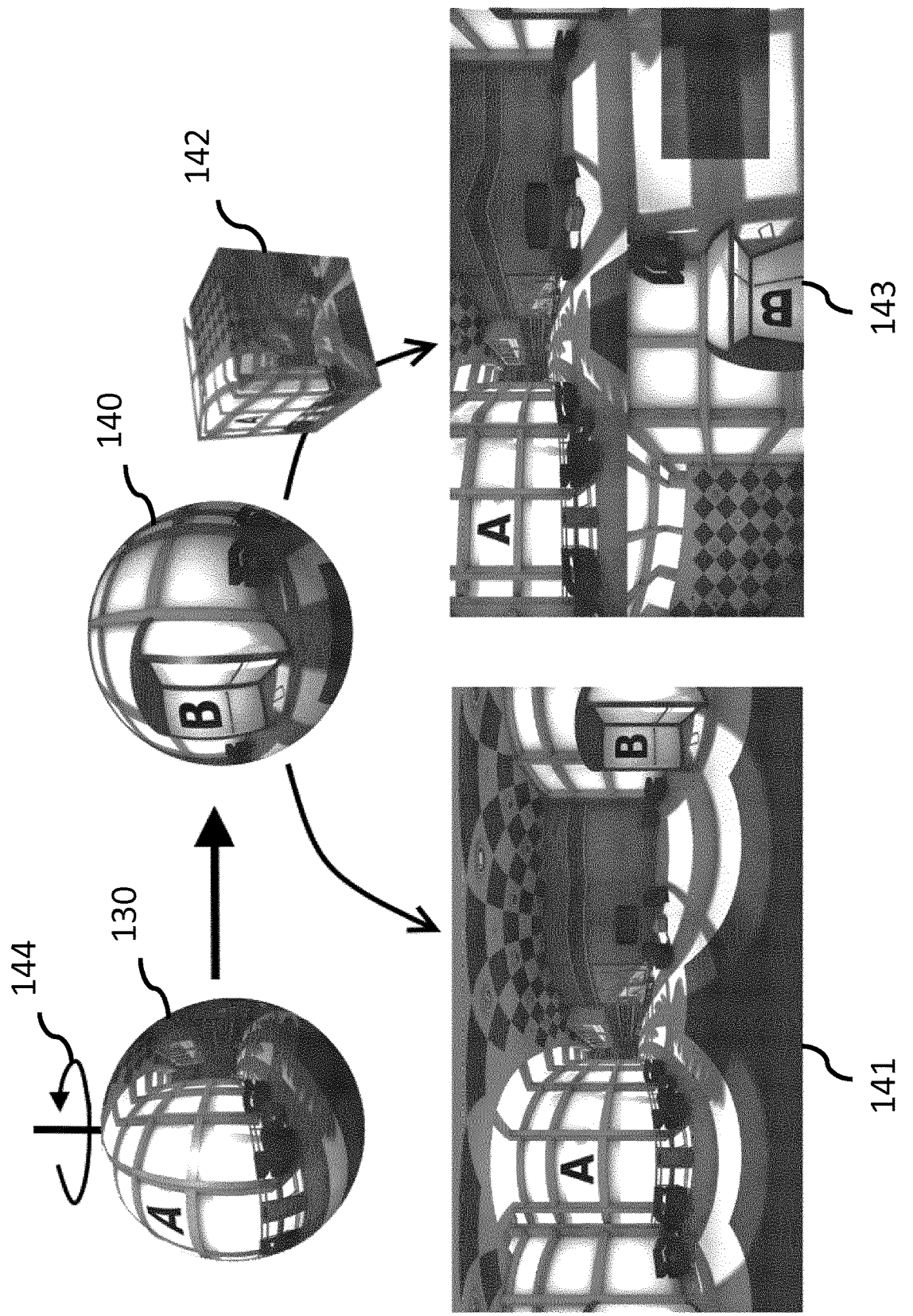
Figure 15:
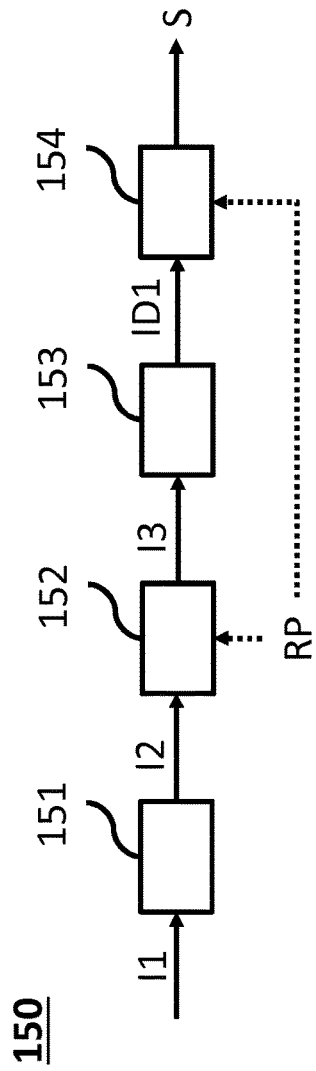
Figure 16:
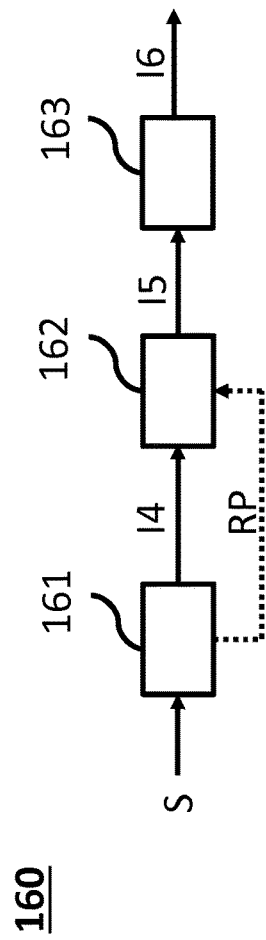
Figure 17:
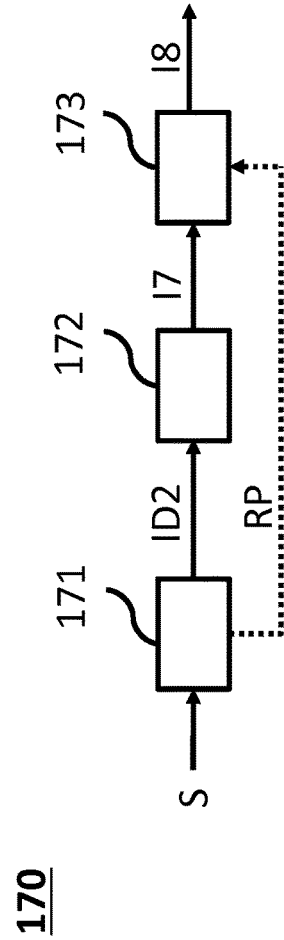
Figure 21:
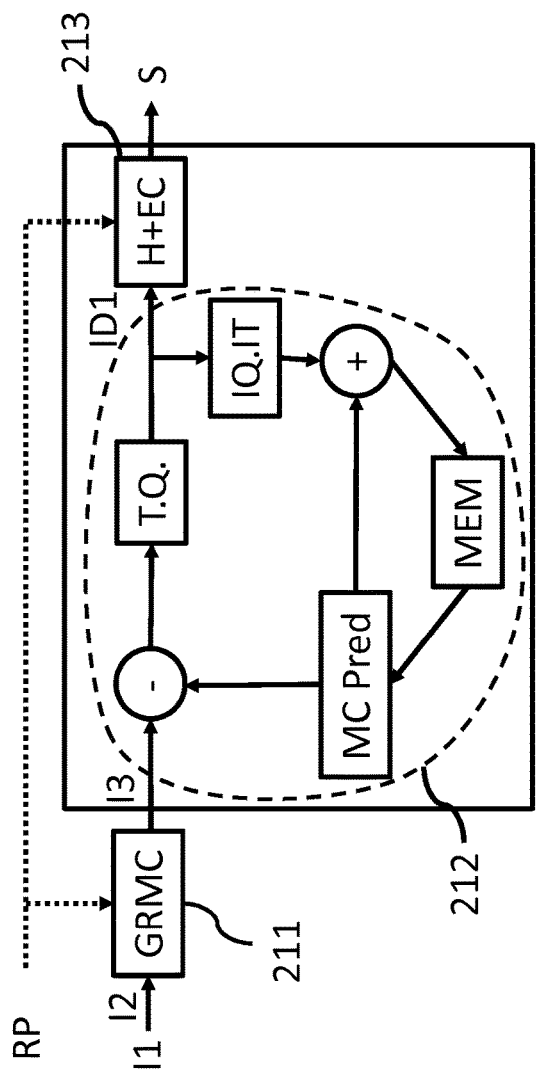
Figure 22:
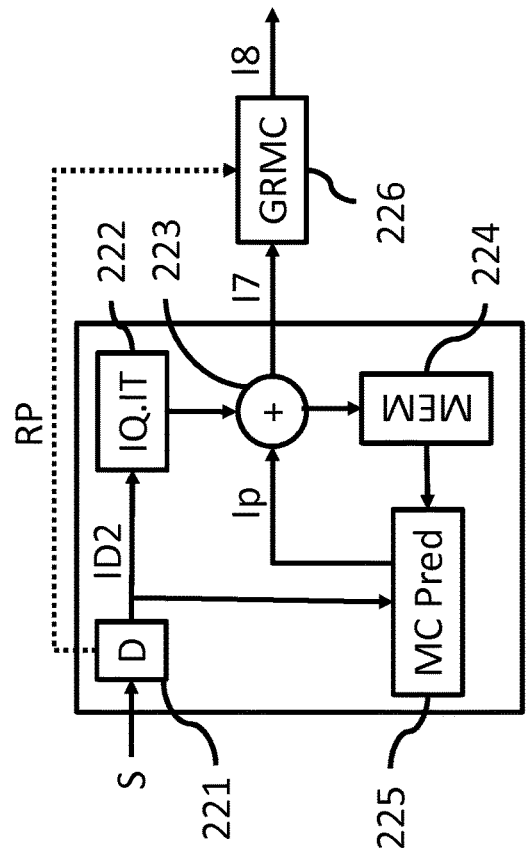
Figure 23:
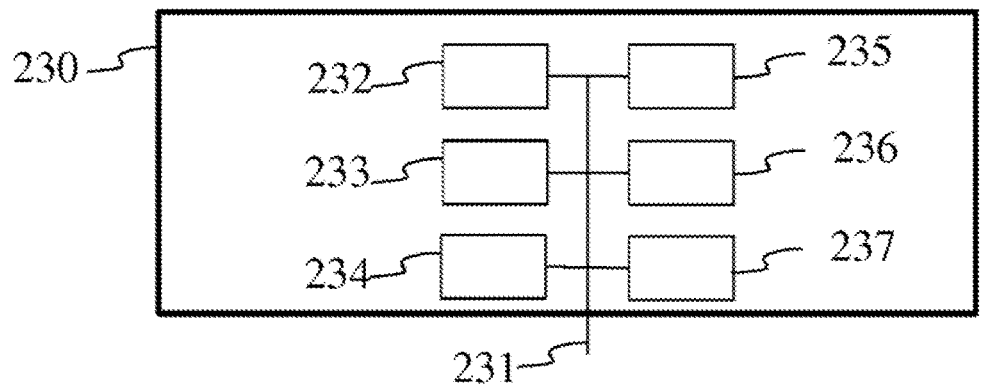
Figure 24:
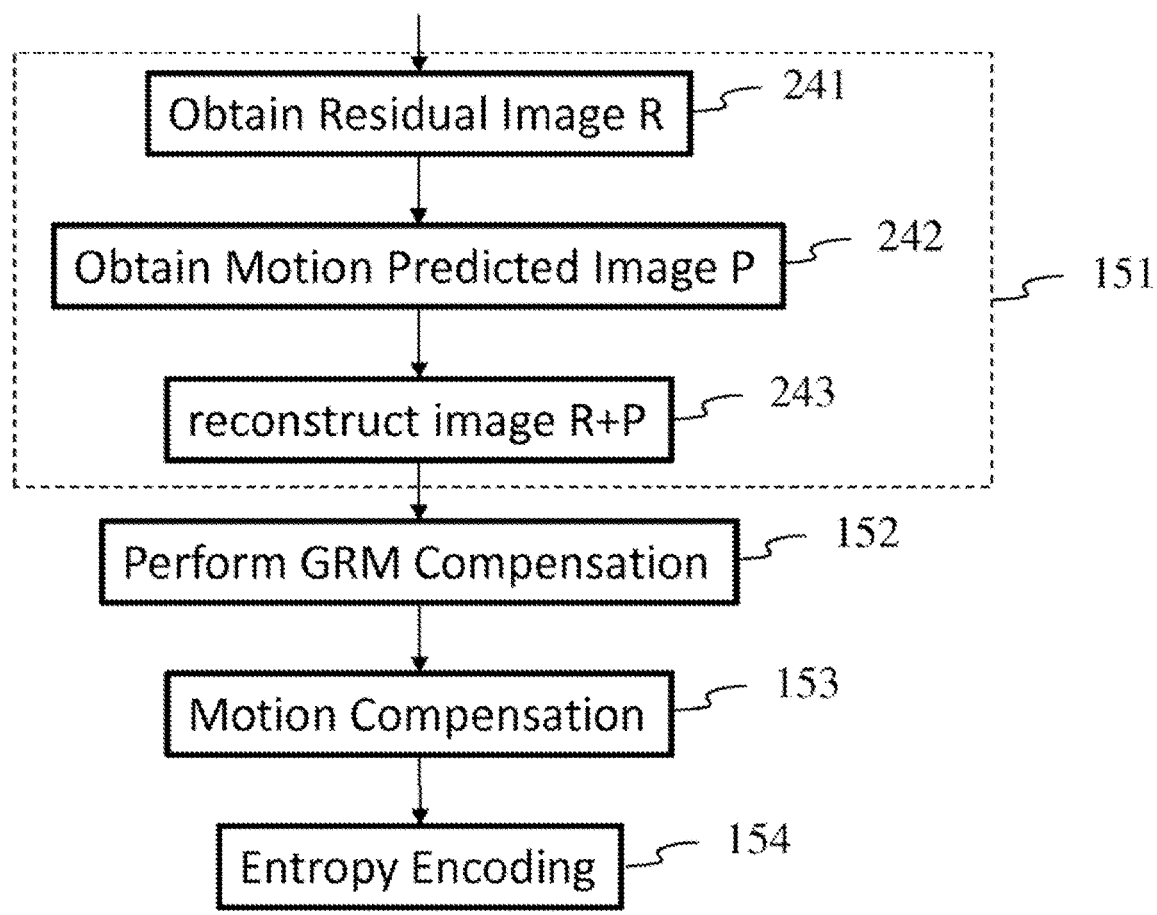
Figures 25, 26:
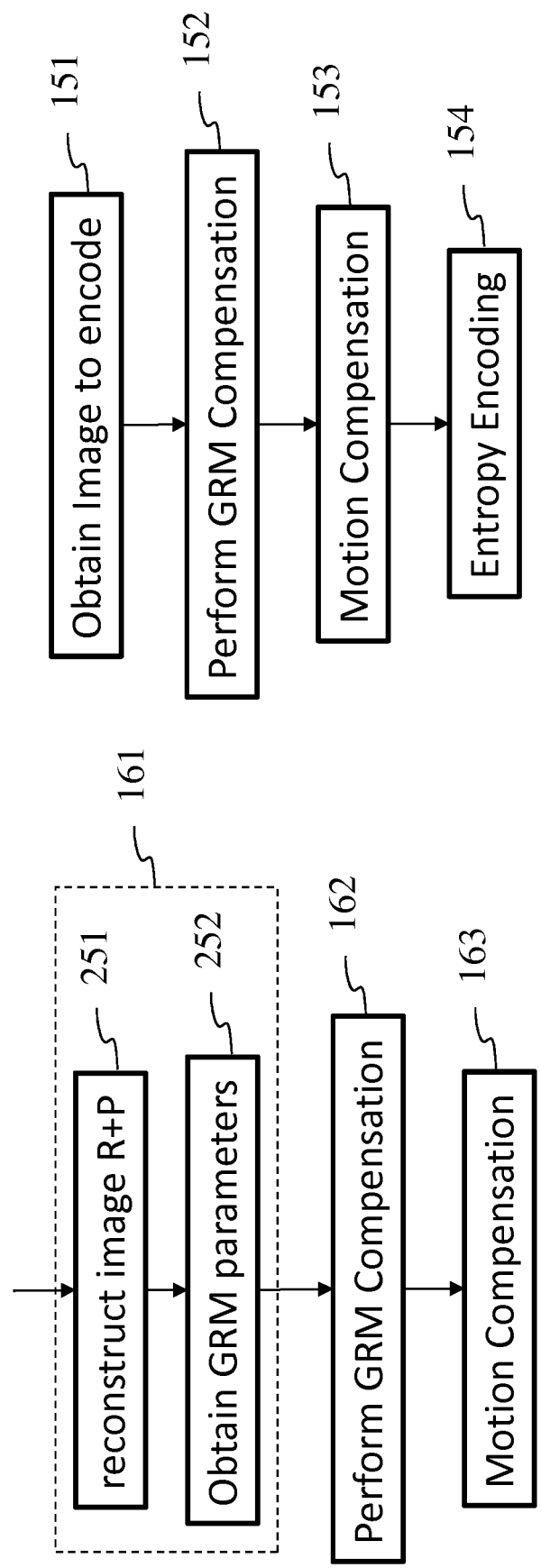
Figure 27:
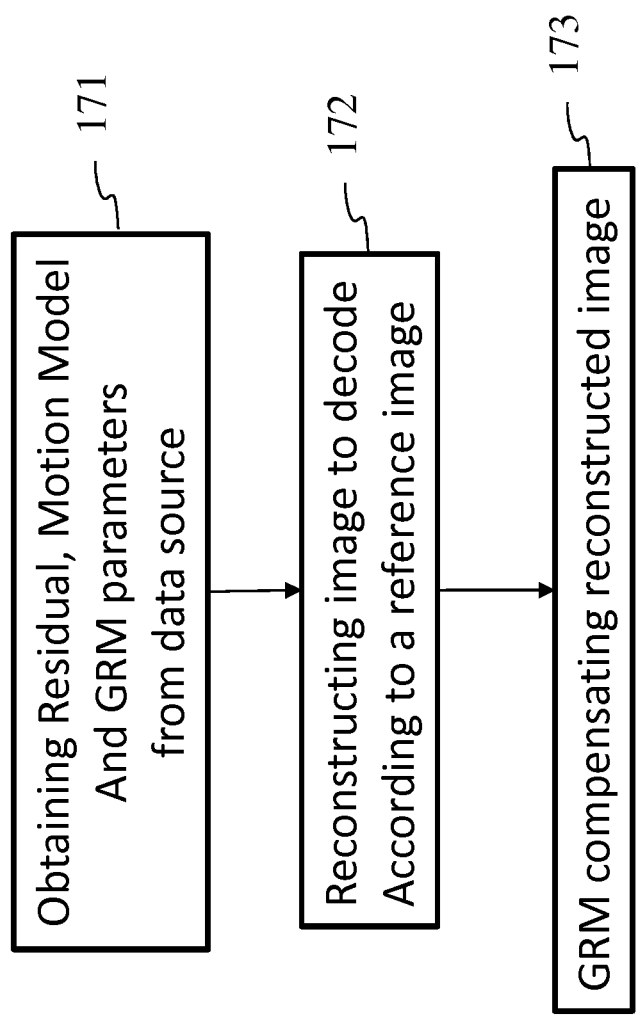

FIG. 8 represents a first embodiment of a system according to the present disclosure, FIG. 9 represents a first embodiment of a system according to the present disclosure, FIG. 10 represents a first embodiment of an immersive video rendering device according to the present disclosure, FIG. 11 represents a first embodiment of an immersive video rendering device according to the present disclosure, FIG. 12 represents a first embodiment of an immersive video rendering device according to the present disclosure, FIG. 13 shows an example of mapping an omnidirectional video on a frame according to two different mapping functions, according to a particular embodiment of the present principles;

FIG. 14 shows an example of mapping the omnidirectional video of FIG. 13 after a panning, according to a particular embodiment of the present principles;

FIG. 15 diagrammatically illustrates a method of encoding an image to be encoded by motion compensating an input image responsive to the image to be encoded, according to a particular embodiment of the present principles;

FIG. 16 diagrammatically illustrates a method of decoding an image of a sequence of images by motion compensating an input image responsive to the image to be decoded, according to a particular embodiment of the present principles;

FIG. 17 diagrammatically illustrates another method of decoding an image of a sequence of images by motion compensating an input image responsive to the image to be decoded, according to a particular embodiment of the present principles;

FIG. 18 illustrates a particular embodiment of the data structure of a bit stream carrying data representative of a sequence of images encoded according to the method of FIG. 15, according to a particular embodiment of the present principles;

FIG. 24 illustrates a first embodiment of the method 150 of the FIG. 15, according to a particular embodiment of the present principles;

FIG. 25 illustrates an embodiment of the method 160 of the FIG. 16, according to a particular embodiment of the present principles;

FIG. 26 illustrates a second embodiment of the method 150 of the FIG. 15, according to a particular embodiment of the present principles;

FIG. 27 illustrates an embodiment of the method 170 of the FIG. 17, according to a particular embodiment of the present principles;

FIG. 19 shows a block diagram of a first embodiment of a device configured to encode an image of a sequence of images by motion compensating an input image responsive to the image to be encoded, implementing steps of the method of FIG. 24, according to a particular embodiment of the present principles;

FIG. 20 shows an embodiment of a device configured to decode a bit stream encoded according to the first embodiment of the method illustrated in FIG. 24, according to a particular embodiment of the present principles;

FIG. 21 shows a block diagram of a second embodiment of a device configured to encode an image of a sequence of images by motion compensating an input image responsive to the image to be encoded, implementing steps of the method of FIG. 26, according to a particular embodiment of the present principles;

FIG. 22 shows an embodiment of a device configured to decode a bit stream encoded according to the second embodiment of the method illustrated in FIG. 26, according to a particular embodiment of the present principles;

FIG. 23 shows a hardware embodiment of an apparatus configured to implement methods described in relation with FIG. 15, 16, 17, 19, 20, 21 or 22, according to a particular embodiment of the present principles.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It is understood that subject matter embodiments can be practiced without these specific details.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π, steradians, immersive, omnidirectional or large field of view for example.

An immersive video is a video encoded on at least one rectangular frame that is a two-dimension array of pixels (i.e. element of color information) like a "regular" video. To be rendered, the frame is, first, mapped on the inner face of a convex volume, also called mapping surface (e.g. a sphere, a cube, a pyramid), and, second, a part of this volume is captured by a virtual camera. Images captured by the virtual camera are rendered on the screen of the immersive display device. A stereoscopic video is encoded on one or two rectangular frames, projected on two mapping surfaces which are combined to be captured by two virtual cameras according to the characteristics of the device.

Pixels are encoded according to a mapping function in the frame. The mapping function depends on the mapping surface. For a same mapping surface, several mapping functions are possible. For example, the faces of a cube may be structured according to different layouts within the frame surface. A sphere may be mapped according to an equirectangular projection or to a gnomonic projection for example. The organization of pixels resulting from the selected projection function modifies or breaks lines continuities, orthonormal local frame, pixel densities and introduces periodicity in time and space. These are typical features that are used to encode and decode videos. There is a lack of taking specificities of immersive videos into account in encoding and decoding methods. Indeed, as immersive videos are 360° videos, a panning, for example, introduces motion and discontinuities that require a large amount of data to be encoded while the content of the scene does not change.

Taking immersive videos specificities into account while encoding and decoding video frames would bring valuable advantages to the state-of-art methods.

Figure 1:
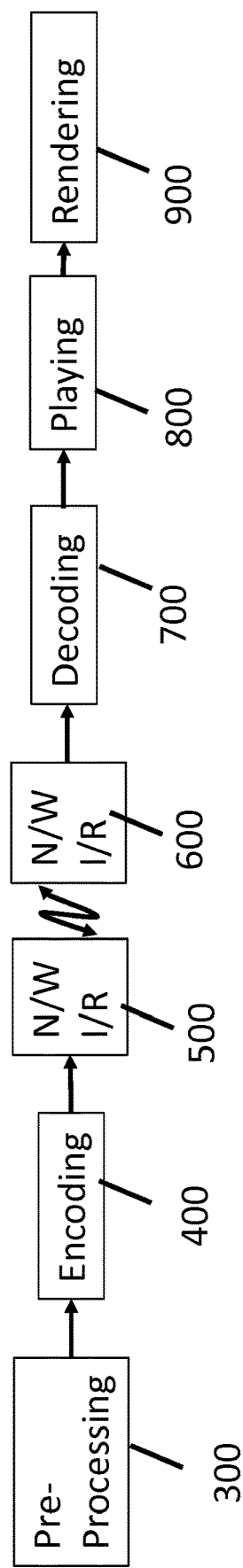
FIG. 1 represents a functional overview of an encoding and decoding system according to an example environment of the embodiments of the disclosure.

FIG. 1 illustrates a general overview of an encoding and decoding system according to an example embodiment. The system of FIG. 1 is a functional system. A pre-processing module 300 may prepare the content for encoding by the encoding device 400. The pre-processing module 300 may perform multi-image acquisition, merging of the acquired multiple images in a common space (typically a 3D sphere if we encode the directions), and mapping of the 3D sphere into a 2D frame using, for example, but not limited to, an equirectangular mapping or a cube mapping. The pre-processing module 300 may also accept an omnidirectional video in a particular format (for example, equirectangular) as input, and pre-processes the video to change the mapping into a format more suitable for encoding. Depending on the acquired video data representation, the pre-processing module 300 may perform a mapping space change. The encoding device 400 and the encoding method will be described with respect to other figures of the specification. After being encoded, the data, which may encode immersive video data or 3D CGI encoded data for instance, are sent to a network interface 500, which can be typically implemented in any network interface, for instance present in a gateway. The data are then transmitted through a communication network, such as internet but any other network can be foreseen. Then the data are received via network interface 600. Network interface 600 can be implemented in a gateway, in a television, in a set-top box, in a head mounted display device, in an immersive (projective) wall or in any immersive video rendering device. After reception, the data are sent to a decoding device 700. Decoding function is one of the processing functions described in the following FIGS. 2 to 12. Decoded data are then processed by a player 800. Player 800 prepares the data for the rendering device 900 and may receive external data from sensors or users input data. More precisely, the player 800 prepares the part of the video content that is going to be displayed by the rendering device 900. The decoding device 700 and the player 800 may be integrated in a single device (e.g., a smartphone, a game console, a STB, a tablet, a computer, etc.). In a variant, the player 800 is integrated in the rendering device 900.

Several types of systems may be envisioned to perform the decoding, playing and rendering functions of an immersive display device, for example when rendering an immersive video.

A first system, for processing augmented reality, virtual reality, or augmented virtuality content is illustrated in FIGS. 2 to 6. Such a system comprises processing functions, an immersive video rendering device which may be a head-mounted display (HMD), a tablet or a smartphone for example and may comprise sensors. The immersive video rendering device may also comprise additional interface modules between the display device and the processing functions. The processing functions can be performed by one or several devices. They can be integrated into the immersive video rendering device or they can be integrated into one or several processing devices. The processing device comprises one or several processors and a communication interface with the immersive video rendering device, such as a wireless or wired communication interface.

The processing device can also comprise a second communication interface with a wide access network such as internet and access content located on a cloud, directly or through a network device such as a home or a local gateway. The processing device can also access a local storage through a third interface such as a local access network interface of Ethernet type. In an embodiment, the processing device may be a computer system having one or several processing units. In another embodiment, it may be a smartphone which can be connected through wired or wireless links to the immersive video rendering device or which can be inserted in a housing in the immersive video rendering device and communicating with it through a connector or wirelessly as well. Communication interfaces of the processing device are wireline interfaces (for example a bus interface, a wide area network interface, a local area network interface) or wireless interfaces (such as a IEEE 802.11 interface or a Bluetooth® interface).

When the processing functions are performed by the immersive video rendering device, the immersive video rendering device can be provided with an interface to a network directly or through a gateway to receive and/or transmit content.

In another embodiment, the system comprises an auxiliary device which communicates with the immersive video rendering device and with the processing device. In such an embodiment, this auxiliary device can contain at least one of the processing functions.

The immersive video rendering device may comprise one or several displays. The device may employ optics such as lenses in front of each of its display. The display can also be a part of the immersive display device like in the case of smartphones or tablets. In another embodiment, displays and optics may be embedded in a helmet, in glasses, or in a visor that a user can wear. The immersive video rendering device may also integrate several sensors, as described later on. The immersive video rendering device can also comprise several interfaces or connectors. It might comprise one or several wireless modules in order to communicate with sensors, processing functions, handheld or other body parts related devices or sensors.

The immersive video rendering device can also comprise processing functions executed by one or several processors and configured to decode content or to process content. By processing content here, it is understood all functions to prepare a content that can be displayed. This may comprise, for instance, decoding a content, merging content before displaying it and modifying the content to fit with the display device.

One function of an immersive content rendering device is to control a virtual camera which captures at least a part of the content structured as a virtual volume. The system may comprise pose tracking sensors which totally or partially track the user's pose, for example, the pose of the user's head, in order to process the pose of the virtual camera. Some positioning sensors may track the displacement of the user. The system may also comprise other sensors related to environment for example to measure lighting, temperature or sound conditions. Such sensors may also be related to the users' bodies, for instance, to measure sweating or heart rate. Information acquired through these sensors may be used to process the content. The system may also comprise user input devices (e.g. a mouse, a keyboard, a remote control, a joystick). Information from user input devices may be used to process the content, manage user interfaces or to control the pose of the virtual camera. Sensors and user input devices communicate with the processing device and/or with the immersive rendering device through wired or wireless communication interfaces.

Using FIGS. 2 to 6, several embodiments are described of this first type of system for displaying augmented reality, virtual reality, augmented virtuality or any content from augmented reality to virtual reality.

Figure 2:
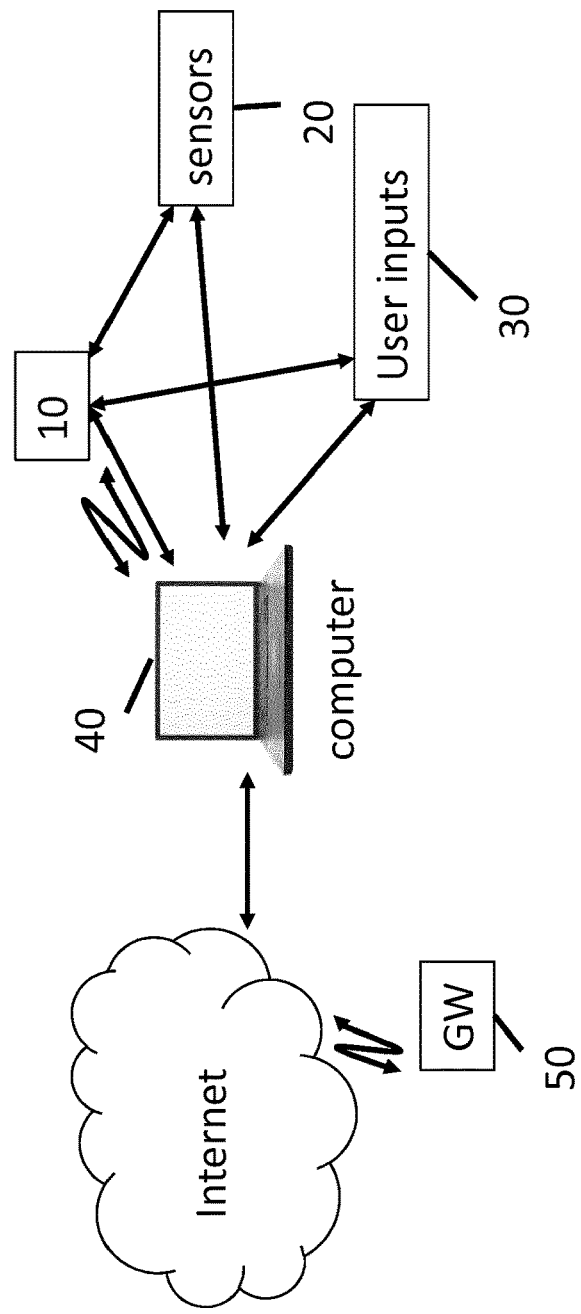
FIG. 2 represents a first embodiment of a system, according to a particular embodiment of the present principles.

FIG. 2 illustrates a particular embodiment of a system configured to decode, process and render immersive videos. The system comprises an immersive video rendering device 10, sensors 20, user inputs devices 30, a computer 40 and a gateway 50 (optional).

The immersive video rendering device 10, illustrated on FIG. 10, comprises a display 101. The display is, for example of OLED or LCD type. The immersive video rendering device 10 is, for instance a HMD, a tablet or a smartphone. The device 10 may comprise a touch surface 102 (e.g. a touchpad or a tactile screen), a camera 103, a memory 105 in connection with at least one processor 104 and at least one communication interface 106. The at least one processor 104 processes the signals received from the sensors 20. Some of the measurements from sensors are used to compute the pose of the device and to control the virtual camera. Sensors used for pose estimation are, for instance, gyroscopes, accelerometers or compasses. More complex systems, for example using a rig of cameras may also be used. In this case, the at least one processor performs image processing to estimate the pose of the device 10. Some other measurements are used to process the content according to environment conditions or user's reactions. Sensors used for observing environment and users are, for instance, microphones, light sensor or contact sensors. More complex systems may also be used like, for example, a video camera tracking user's eyes. In this case the at least one processor performs image processing to operate the expected measurement. Data from sensors 20 and user input devices 30 can also be transmitted to the computer 40 which will process the data according to the input of these sensors.

Memory 105 includes parameters and code program instructions for the processor 104. Memory 105 can also comprise parameters received from the sensors 20 and user input devices 30. Communication interface 106 enables the immersive video rendering device to communicate with the computer 40. The Communication interface 106 of the processing device is wireline interfaces (for example a bus interface, a wide area network interface, a local area network interface) or wireless interfaces (such as a IEEE 802.11 interface or a Bluetooth® interface). Computer 40 sends data and optionally control commands to the immersive video rendering device 10. The computer 40 is in charge of processing the data, i.e. prepare them for display by the immersive video rendering device 10. Processing can be done exclusively by the computer 40 or part of the processing can be done by the computer and part by the immersive video rendering device 10. The computer 40 is connected to internet, either directly or through a gateway or network interface 50. The computer 40 receives data representative of an immersive video from the internet, processes these data (e.g. decodes them and possibly prepares the part of the video content that is going to be displayed by the immersive video rendering device 10) and sends the processed data to the immersive video rendering device 10 for display. In a variant, the system may also comprise local storage (not represented) where the data representative of an immersive video are stored, said local storage can be on the computer 40 or on a local server accessible through a local area network for instance (not represented).

FIG. 3 represents a second embodiment. In this embodiment, a STB 90 is connected to a network such as internet directly (i.e. the STB 90 comprises a network interface) or via a gateway 50. The STB 90 is connected through a wireless interface or through a wired interface to rendering devices such as a television set 100 or an immersive video rendering device 200. In addition to classic functions of a STB, STB 90 comprises processing functions to process video content for rendering on the television 100 or on any immersive video rendering device 200. These processing functions are the same as the ones that are described for computer 40 and are not described again here. Sensors 20 and user input devices 30 are also of the same type as the ones described earlier with regards to FIG. 2. The STB 90 obtains the data representative of the immersive video from the internet. In a variant, the STB 90 obtains the data representative of the immersive video from a local storage (not represented) where the data representative of the immersive video are stored.

FIG. 4 represents a third embodiment related to the one represented in FIG. 2. The game console 60 processes the content data. Game console 60 sends data and optionally control commands to the immersive video rendering device 10. The game console 60 is configured to process data representative of an immersive video and to send the processed data to the immersive video rendering device 10 for display. Processing can be done exclusively by the game console 60 or part of the processing can be done by the immersive video rendering device 10.

The game console 60 is connected to internet, either directly or through a gateway or network interface 50. The game console 60 obtains the data representative of the immersive video from the internet. In a variant, the game console 60 obtains the data representative of the immersive video from a local storage (not represented) where the data representative of the immersive video are stored, said local storage can be on the game console 60 or on a local server accessible through a local area network for instance (not represented).

The game console 60 receives data representative of an immersive video from the internet, processes these data (e.g. decodes them and possibly prepares the part of the video that is going to be displayed) and sends the processed data to the immersive video rendering device 10 for display. The game console 60 may receive data from sensors 20 and user input devices 30 and may use them to process the data representative of an immersive video obtained from the internet or from the from the local storage.

Figure 5:
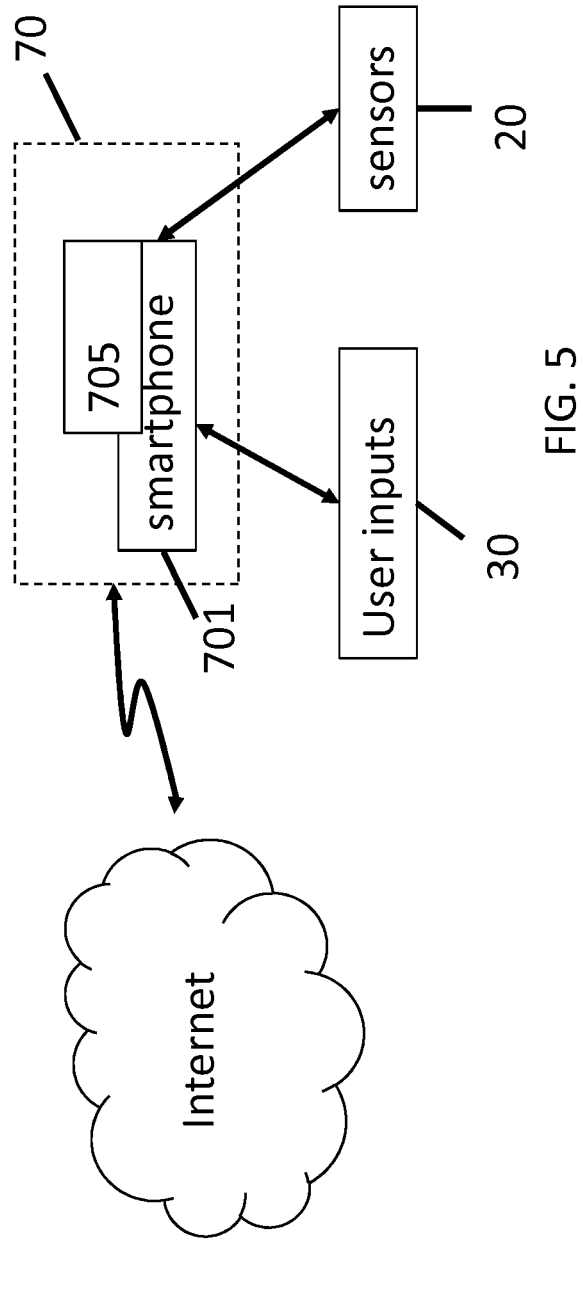
FIG. 5 represents a first embodiment of a system, according to a particular embodiment of the present principles.

FIG. 5 represents a fourth embodiment of said first type of system where the immersive video rendering device 70 is formed by a smartphone 701 inserted in a housing 705. The smartphone 701 may be connected to internet and thus may obtain data representative of an immersive video from the internet. In a variant, the smartphone 701 obtains data representative of an immersive video from a local storage (not represented) where the data representative of an immersive video are stored, said local storage can be on the smartphone 701 or on a local server accessible through a local area network for instance (not represented).

Immersive video rendering device 70 is described with reference to FIG. 11 which gives a preferred embodiment of immersive video rendering device 70. It optionally comprises at least one network interface 702 and the housing 705 for the smartphone 701. The smartphone 701 comprises all functions of a smartphone and a display. The display of the smartphone is used as the immersive video rendering device 70 display. Therefore no display other than the one of the smartphone 701 is included. However, optics 704, such as lenses, are included for seeing the data on the smartphone display. The smartphone 701 is configured to process (e.g. decode and prepare for display) data representative of an immersive video possibly according to data received from the sensors 20 and from user input devices 30. Some of the measurements from sensors are used to compute the pose of the device and to control the virtual camera. Sensors used for pose estimation are, for instance, gyroscopes, accelerometers or compasses. More complex systems, for example using a rig of cameras may also be used. In this case, the at least one processor performs image processing to estimate the pose of the device 10. Some other measurements are used to process the content according to environment conditions or user's reactions. Sensors used for observing environment and users are, for instance, microphones, light sensor or contact sensors. More complex systems may also be used like, for example, a video camera tracking user's eyes. In this case the at least one processor performs image processing to operate the expected measurement.

Figure 6:
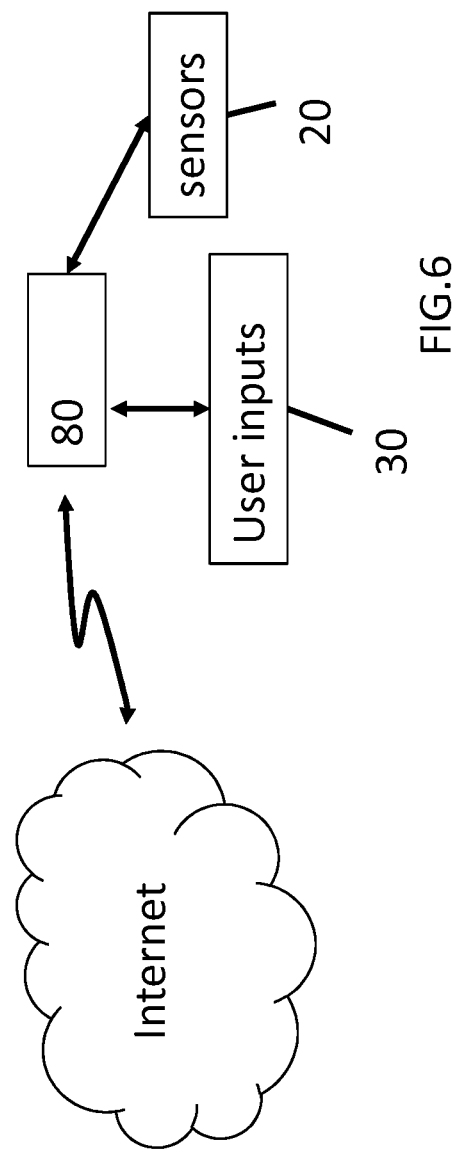
FIG. 6 represents a first embodiment of a system, according to a particular embodiment of the present principles.

FIG. 6 represents a fifth embodiment of said first type of system in which the immersive video rendering device 80 comprises all functionalities for processing and displaying the data content. The system comprises an immersive video rendering device 80, sensors 20 and user input devices 30. The immersive video rendering device 80 is configured to process (e.g. decode and prepare for display) data representative of an immersive video possibly according to data received from the sensors 20 and from the user input devices 30. The immersive video rendering device 80 may be connected to internet and thus may obtain data representative of an immersive video from the internet. In a variant, the immersive video rendering device 80 obtains data representative of an immersive video from a local storage (not represented) where the data representative of an immersive video are stored, said local storage can be on the rendering device 80 or on a local server accessible through a local area network for instance (not represented).

The immersive video rendering device 80 is illustrated on FIG. 12. The immersive video rendering device comprises a display 801. The display can be for example of OLED or LCD type, a touchpad (optional) 802, a camera (optional) 803, a memory 805 in connection with at least one processor 804 and at least one communication interface 806. Memory 805 comprises parameters and code program instructions for the processor 804. Memory 805 can also comprise parameters received from the sensors 20 and user input devices 30. Memory can also be large enough to store the data representative of the immersive video content. For this several types of memories can exist and memory 805 can be a single memory or can be several types of storage (SD card, hard disk, volatile or non-volatile memory . . . ) Communication interface 806 enables the immersive video rendering device to communicate with internet network. The processor 804 processes data representative of the video in order to display them of display 801. The camera 803 captures images of the environment for an image processing step. Data are extracted from this step in order to control the immersive video rendering device.

A second system, for processing augmented reality, virtual reality, or augmented virtuality content is illustrated in FIGS. 7 to 9. Such a system comprises an immersive wall.

FIG. 7 represents a system of the second type. It comprises a display 1000 which is an immersive (projective) wall which receives data from a computer 4000. The computer 4000 may receive immersive video data from the internet. The computer 4000 is usually connected to internet, either directly or through a gateway 5000 or network interface. In a variant, the immersive video data are obtained by the computer 4000 from a local storage (not represented) where the data representative of an immersive video are stored, said local storage can be in the computer 4000 or in a local server accessible through a local area network for instance (not represented).

This system may also comprise sensors 2000 and user input devices 3000. The immersive wall 1000 can be of OLED or LCD type. It can be equipped with one or several cameras. The immersive wall 1000 may process data received from the sensor 2000 (or the plurality of sensors 2000). The data received from the sensors 2000 may be related to lighting conditions, temperature, environment of the user, e.g. position of objects.

The immersive wall 1000 may also process data received from the user inputs devices 3000. The user input devices 3000 send data such as haptic signals in order to give feedback on the user emotions. Examples of user input devices 3000 are handheld devices such as smartphones, remote controls, and devices with gyroscope functions.

Sensors 2000 and user input devices 3000 data may also be transmitted to the computer 4000. The computer 4000 may process the video data (e.g. decoding them and preparing them for display) according to the data received from these sensors/user input devices. The sensors signals can be received through a communication interface of the immersive wall. This communication interface can be of Bluetooth type, of WIFI type or any other type of connection, preferentially wireless but can also be a wired connection.

Computer 4000 sends the processed data and optionally control commands to the immersive wall 1000. The computer 4000 is configured to process the data, i.e. preparing them for display, to be displayed by the immersive wall 1000. Processing can be done exclusively by the computer 4000 or part of the processing can be done by the computer 4000 and part by the immersive wall 1000.

FIG. 8 represents another system of the second type. It comprises an immersive (projective) wall 6000 which is configured to process (e.g. decode and prepare data for display) and display the video content. It further comprises sensors 2000, user input devices 3000.

The immersive wall 6000 receives immersive video data from the internet through a gateway 5000 or directly from internet. In a variant, the immersive video data are obtained by the immersive wall 6000 from a local storage (not represented) where the data representative of an immersive video are stored, said local storage can be in the immersive wall 6000 or in a local server accessible through a local area network for instance (not represented).

This system may also comprise sensors 2000 and user input devices 3000. The immersive wall 6000 can be of OLED or LCD type. It can be equipped with one or several cameras. The immersive wall 6000 may process data received from the sensor 2000 (or the plurality of sensors 2000). The data received from the sensors 2000 may be related to lighting conditions, temperature, environment of the user, e.g. position of objects.

The immersive wall 6000 may also process data received from the user inputs devices 3000. The user input devices 3000 send data such as haptic signals in order to give feedback on the user emotions. Examples of user input devices 3000 are handheld devices such as smartphones, remote controls, and devices with gyroscope functions.

The immersive wall 6000 may process the video data (e.g. decoding them and preparing them for display) according to the data received from these sensors/user input devices. The sensors signals can be received through a communication interface of the immersive wall. This communication interface can be of Bluetooth type, of WIFI type or any other type of connection, preferentially wireless but can also be a wired connection. The immersive wall 6000 may comprise at least one communication interface to communicate with the sensors and with internet.

FIG. 9 illustrates a third embodiment where the immersive wall is used for gaming. One or several gaming consoles 7000 are connected, preferably through a wireless interface to the immersive wall 6000. The immersive wall 6000 receives immersive video data from the internet through a gateway 5000 or directly from internet. In a variant, the immersive video data are obtained by the immersive wall 6000 from a local storage (not represented) where the data representative of an immersive video are stored, said local storage can be in the immersive wall 6000 or in a local server accessible through a local area network for instance (not represented).

Gaming console 7000 sends instructions and user input parameters to the immersive wall 6000. Immersive wall 6000 processes the immersive video content possibly according to input data received from sensors 2000 and user input devices 3000 and gaming consoles 7000 in order to prepare the content for display. The immersive wall 6000 may also comprise internal memory to store the content to be displayed.

According to a non-limitative embodiment of the present disclosure, methods and devices to encode images of a large field-of-view video in a stream are disclosed. Methods and devices to decode images of a large field-of-view video from a stream are also disclosed. Syntaxes of a stream encoding images of a large field-of-view video are also disclosed.

FIG. 13 shows an example of mapping an omnidirectional video on a frame according to two different mapping functions. A 3D scene, here a hotel hall, is projected on a spherical mapping surface 130. A front direction is selected for mapping the surface on a frame. The front direction may correspond to the part of the content displayed in front of the user when rendering on an immersive video rendering device as described on FIGS. 2 to 12. In the example of FIG. 13, the front direction is facing the window with an 'A' printed on it. A revolving door with a 'B' printed on stands on the left of the front direction. The pre-processing module of FIG. 1 performs a mapping of the projection 130 in a frame. Different mapping functions may be used leading to different frames. In the example of FIG. 13, the pre-processing module 300 generates a sequence of frames 131 according to an equirectangular mapping function applied to the sphere 130. In a variant, the pre-processing module 300 performs a mapping space change, transforming the sphere 130 into a cube 132 before mapping the cube 132 on a frame 133 according to a cube layout 134. The example cube layout of FIG. 13 divides the frame in two rows of three squares. On the top row lie left, front and right faces of the cube; on the bottom row lie top back and bottom faces of the cube with a 90° rotation. Continuity is ensured in each row. Numbers on the representation of the cube layout 134 represents the cube edges' connections.

The mapping of the 3D surface on one or more rectangular pictures inevitably introduces some effects that may impact the compression efficiency when encoding the resulting video.

TABLE 1

| Type | Equirectangular | Cubical | Pyramidal |
| --- | --- | --- | --- |
| 3D surface | sphere | cube | Pyramid |
| Straight lines | Continuously distorted | Piece wise straight | Piece-wise straight |

TABLE 1-continued

| Type | Equirectangular | Cubical | Pyramidal |
| --- | --- | --- | --- |
| Orthonormal local picture | no | Yes, except on face boundaries | No, except on square face, |
| Pixel density | Non uniform (higher on equator line) | Almost constant | No except on square face |
| Discontinuities | no | Yes, on each face boundaries | Yes, on each face boundaries |
| Periodicity | Yes, horizontal | Yes, between some faces | Yes, between some faces |

Indeed the projection may introduce the followings effects:

Strong geometry distortions:
  a straight lines are not straight anymore,
  orthonormal coordinate system are not orthonormal anymore
Non uniform pixel density: a pixel in the picture to encode does not always represent the same surface on the surface to encode (e.g. a pole of a sphere may be represented by a line of pixels in the 2D image),
Strong discontinuities: the picture layout may introduce strong discontinuities between 2 adjacent pixels on the surface,
Some periodicity may occur in the picture (for example from one border to the opposite one).

Table 1 lists examples of such effects for various mapping functions. Some of these effects appear on video frames 131 and 133 of FIG. 13 and frames 141 and 143 of FIG. 14.

FIG. 14 shows an example of mapping the omnidirectional video of FIG. 13 after a panning. The front direction of the 3D scene is rotating 144. The 3D scene is the same as the one of FIG. 13, only the front direction is rotating. On the example of FIG. 14, the rotation corresponds to a panning on the left-hand side. The front direction of the sphere 140 is facing the corridor and the window with an 'A' is on the left while the revolving door with a 'B' is in the back. The mapping of the sphere 140 according to an equirectangular mapping function generates the video frame 141. In a variant, the pre-processing module performs a mapping space change, transforming the sphere 140 in a cube 142 before mapping the cube 142 on a frame 143 according to the cube layout 134 of FIG. 13. The 3D rotation 144 of the mapping surface is denoted using Euler angles notation (α, β, γ). We denote by (α(t), β(t), γ(t)) the orientation of the front direction in the 3D scene at time t. The angles are set according to a frame of reference. The front direction may be expressed according to an absolute frame of reference, for example, the North direction in the horizontal plan. In a variant, the front direction, further called global rotation motion parameters, associated with an image is set in a frame of reference relative to the front direction of a reference image. In such a variant, the angles associated with an image corresponds to a difference (e.g. subtraction) between its own front direction and the front direction of the reference image.

These angles correspond to the orientation of the acquisition system which may be real or virtual. The acquisition system transmits the angles representative of the orientation of the front direction to the encoding module 400 associated with each frame. In a variant the front direction angles are transmitted only when a rotation of the acquisition system is detected. In another variant, the front direction angles are transmitted to the encoding module 400 at a regular frequency, for instance every ten frames or every twenty-four frames. In another embodiment, the acquisition system does not rotate. The front direction is managed by an editing module (not represented on FIG. 1) intermediate between the acquisition system and the encoding module 400. The editing module transmits the front direction angles modified by a human operator or by an algorithm to the encoding module 400 associated with each frame or each time a rotation is detected or at a regular frequency according to a selected variant. In another embodiment, the pre-processing module 300 computes the front direction angles by comparing two mapped surfaces (e.g. spheres 130 and 140) or two frames generated according to a selected mapping function (e.g. frames 131 and 141 or 133 and 143). The variations of the front direction angles correspond to a global rotation motion of the frames. For an omnidirectional video, as the entirety of the scene is captured, a global rotation motion does not modify the content information of the images. Frames 131 and 141 (reciprocally 133 and 143) are representative of the same 3D scene and contain the same colour information (up to grid interpolation), encoded from different front directions. However, pixels of pictures 131 and 141 are drastically different. The encoding, with video compression standard methods, of a sequence of frames including a global rotation motion (as a panning for instance) implies the calculation of motion models which are computationally demanding and which require a large amount of data while the encoded 3D scene remains the same.

Video compression standards such as HEVC, H.264/AVC, etc., exploits temporal redundancies to reduce the information to encode. It is based on inter-prediction which operates a Motion Compensation (MC) of the reconstructed blocks of the pictures corresponding to previous or other instants. A pixel $p_2$ of the picture $P_2$ at time $t_2$ corresponds to the pixel $p_1$ of the picture $P_1$ at time $t_1$.

$$p_2(x_2,y_2,t_2)=p_1(x_1,y_1,t_1) \quad [\text{eq1}]$$

The displacement of the pixel between $P_1$ and $P_2$ can be decomposed as in equation eq2.

$$p_2(x_2,y_2,t_2)-p_1(x_1,y_1,t_1)=dp(t_1,t_2)+gmc(p,t_1,t_2) \quad [\text{eq2}]$$

Where p is the pixel (i.e. the identification of $p_1$ and $p_2$ as a same pixel), dp is the apparent motion of the pixel due to the proper motion of the physical point in the 3D scene and gmc is the apparent motion of the pixel due to the global rotation motion. When the front direction rotates, the pixels of the pictures will change significantly, even if the scene has not changed (i.e. $dp(t_1, t_2)=(0,0)$). This frequently occurs in practice, since the front direction often points towards the objects of interest in the scene and adapts the point of view by rotating the frame of reference.

In an example non-limitative embodiment of the present principles, operating a global rotation motion compensation on an input image generates a new image. The global rotation motion parameters (e.g. the front direction angles associated with the input image) are compared to, for example subtracted to, the global rotation motion parameters of a first image. Pixels of the input image are reorganized in a way that the new image represents the same content than the content of the input image as if it has been captured with the front direction of the first image. According to this principles, the input image and the reference image have the advantage to be easily comparable. In a first variant, the input image is a reference image in a compression loop, for example the compression loop of a compression standard such as HEVC or H.264/AVC and the first image is the image to be encoded. In another variant, the input image is the image to be encoded and the first image is a reference image of a compression loop. This embodiment is non limitative.

FIG. 15 diagrammatically illustrates a method 150 of encoding an image I1 of a sequence images by motion compensating an input image I2 responsive to the image I1 to be encoded. This method is implemented in the encoding module 400 of FIG. 1. At step 151, the image I1 is prepared to be the input image I2 of a global rotation motion compensation step 152. Embodiments of step 151 are further described in relation with FIGS. 19 and 21. At step 152, a global rotation motion compensation is applied to the input image I2 according to the global rotation motion parameters RP (i.e. the front direction angles) obtained previously. Embodiments of the step 152 are further described in relation with FIGS. 24 and 26. The step 152 generates a globally rotation motion compensated image I3. At step 153, the image I3 is used as the input of a motion compensation module which generates information data ID1 relative to residual data, motion vectors for blocks and reference images responsive to a predicted image. In a particular embodiment of the present principles, a step 154 generates a bit stream S carrying data representative of the image to be encoded. Global rotation motion parameters RP are encoded within the stream in a lossless manner.

FIG. 16 diagrammatically illustrates a method 160 of decoding an image of a sequence of images by motion compensating an input image responsive to the image to be decoded. A data source S provides a bit stream encoded according to a first embodiment (illustrated by FIG. 24) of the method 150 of FIG. 15. For example, the data source belongs to a set of sources comprising a local memory (e.g. a video memory, a Random Access Memory, a flash memory, a Read Only Memory, a hard disk, etc.), a storage interface (e.g. an interface with a mass storage, an optical disc or a magnetic support) and a communication interface (e.g. a wireline interface (for example a bus interface, a wide area network interface, a local area network interface) or a wireless interface (such as a IEEE 802.11 interface or a Bluetooth® interface)). At step 161, an image I4 is obtained from the stream, the image I4 corresponding to the input of a global rotation motion compensation step 162. Global rotation motion parameters are obtained from the bit stream. Embodiments of step 161 are further described in relation with FIG. 20. In step 162, an image I5 is generated by applying a global rotation motion compensation to the input image I4 according to the global rotation motion parameters RP. Embodiments of step 162 are further described in relation with FIG. 20. In step 163, the image I3 is used as the input of a motion compensation module which generates a decoded image I6.

FIG. 17 diagrammatically illustrates a method 170 of decoding an image of a sequence of images by motion compensating an input image responsive to the image to be decoded. A data source S provides a bit stream encoded by a second embodiment (described by FIG. 26) of the method 150 of FIG. 15. For example, the source belongs to a set of sources comprising a local memory (e.g. a video memory, a Random Access Memory, a flash memory, a Read Only Memory, a hard disk, etc.), a storage interface (e.g. an interface with a mass storage, an optical disc or a magnetic support) and a communication interface (e.g. a wireline interface (for example a bus interface, a wide area network interface, a local area network interface) or a wireless interface (such as a IEEE 802.11 interface or a Bluetooth® interface)). At a step 171, information data ID2 relative to residual data, motion vectors and image references responsive to the image to be decoded are obtained from the bit stream and global rotation motion parameters are obtained from the bit stream. In the step 172, an image I7 is decoded by summing a residual image with a motion predicted image obtained according to information data ID2. Embodiments of step 172 are further described in relation with FIG. 22. In step 173, an image I8 is generated by applying a global rotation motion compensation to the decoded image I7 according to the global rotation motion parameters. Embodiments of step 173 are further described in relation with FIG. 22.

FIG. 24 illustrates a first embodiment of the method 150 of the FIG. 15. In this method, a compression loop is initiated according to a video compression standards such as HEVC, H.264/AVC. Some of the images of the sequence are used as reference images and stored in a memory. Step 151 of method 150 comprises 3 sub-steps 241, 242 and 243 in this embodiment. At step 241, a residual image is calculated by comparing, for example subtracting, the image to encode with a reference image. According to a well-known process, a motion estimation process is used at step 242 to obtain a motion predicted image. The process searches in the reference image a motion data, such as a motion vector, in order to minimize an error computed between pixels of the image to encode and pixels of a reference image or to minimize another metric like a rate-distortion cost. At step 243, a reconstructed image is generated by summing the residual image and the motion predicted image. The outputting of step 243 corresponds to the outputting of step 151. At step 152, the reference image is globally rotation motion compensated according to the GRM parameters of the image to encode. In a variant, the image is compensated of the angle difference between the RM parameters of the image to encode and the GRM parameters of the image of reference. Step 153 comprises motion compensating the image to encode according to the globally rotation motion compensated image of reference. As the image of reference has been globally rotation motion compensated, step 153 is facilitated and the calculated motion model requires a small amount of bits to be encoded. At step 154, the prepared image to encode is entropy encoded. The entropy encoded images of the sequence form a first element of syntax of the bit stream 180 which is stored in the payload part 182 of the bit stream 180. The global rotation motion parameters are comprised in a second element of syntax of the bit stream, said second element of syntax being comprised in the header part 181 of the bit stream 180. The header part 181 is encoded in a lossless manner.

FIG. 25 illustrates an embodiment of the method 160 of the FIG. 16. In this method, a decompression loop is initiated according to a video compression standards such as HEVC, H.264/AVC. Step 161 of the method 160 comprises two sub-steps 251 and 252 in this embodiment. At step 251, a residual image is entropy decoded and a motion model is obtained from the bit stream. A motion predicted image is calculated according to the motion model. Some of the images extracted from the bit stream are used as reference images and stored in a memory. An image, responsive to the image to decode, is reconstructed, for example by summing the residual image and the motion compensated image. At step 252, GRM parameters associated with the image to decode are obtained from the bit stream. Reference images stored in the memory are also associated with their GRM parameters as previously decoded images. At step 162, the reference image associated with the image to decode is globally rotation motion compensated according to the GRM parameters of the image to decode. In a variant, the image is compensated of the angle difference between the RM parameters of the image to encode and the GRM parameters of the image of reference. Step 163 comprises motion compensating the image to decode according to the globally rotation motion compensated image of reference. As the image of reference has been globally rotation motion compensated, step 163 is facilitated.

FIG. 26 illustrates a second embodiment of the method 150 of the FIG. 15. In this embodiment of method 150, step 151 is obtaining the frame to encode and GRM parameters associated with the image. A compression loop has been initiated and some images of the sequence of images have been selected has reference images and stored in a memory. Reference images are also associated with GRM parameters. At step 152, the image to encode is used as input image and is globally rotation motion compensated according to the GRM parameters it is associated to. The image is rotated, for example of angles comprised in the GRM parameters and defined according to an absolute reference direction, for instance, the North in a local horizontal plane. In a variant, the image to encode is associated with a reference image stored in a memory and is rotated of an angle calculated according to the difference between the GRM parameters of the image to encode and the GRM parameters of the reference image. At step 153, the image outputting step 152 enters a compression loop configured according to a video compression standards such as HEVC, H.264/AVC. A motion compensation step is performed. According to a well-known process, the motion estimation searches in a reference image I3 a motion data, such as a motion vector, in order to minimize an error computed between pixels of the image to encode I1 and pixels of a reference image I3 or to minimize another metric like a rate-distortion cost. As the image to encode I1 has been global rotation motion compensated at step 152, the search of motion data is facilitated and the volume of data required to encode them is small. At step 154, the prepared image to encode is entropy encoded. The entropy encoded images of the sequence form a first element of syntax of the bit stream 180 which is stored in the payload part 182 of the bit stream 180. The global rotation motion parameters are comprised in a second element of syntax of the bit stream, said second element of syntax being comprised in the header part 181 of the bit stream 180. The header part 181 is encoded in a lossless manner.

FIG. 27 illustrates an embodiment of the method 170 of the FIG. 17. A data source S provides a bit stream encoded by a second embodiment (described by FIG. 26) of the method 150 of FIG. 15. In this method, a decompression loop is initiated according to a video compression standards such as HEVC, H.264/AVC. Decompression and decoding of at least one reference image has already be performed. The at least one reference image is stored in a memory and is associated with GRM parameters extracted from the data source S. At step 171, information data relative to residual data, motion vectors and global rotation motion parameters responsive to the image to decode are obtained from the bit stream. In the step 172, an image is decoded by summing a residual image with a motion predicted image obtained according to information data. The image to decode is reconstructed according to a well-known process of decompression, comprising a motion compensation process in relation with a reference image stored in a memory. In step 173, the reconstructed image is globally rotation motion compensated according to the global rotation motion parameters associated with the image to decode. The reconstructed image is rotated of a three-dimension angle corresponding to an absolute angle value encoded by the GRM parameters associated with the image to decode, for instance in a frame of reference using the North direction in a local horizontal plane. In a variant, the reconstructed image is rotated of a three-dimension angle corresponding to the difference between an angle encoded in its GRM parameters and an angle encoded in the GRM parameters associated with the reference image used to reconstruct the image to decode.

FIG. 18 illustrates a particular embodiment of the data structure of a bit stream 180 carrying data representative of a sequence of images encoded according to the method 150 of FIG. 15. The entropy encoded images of the sequence form a first element of syntax of the bit stream 180 which is stored in the payload part 182 of the bit stream 180. The global rotation motion parameters are comprised in a second element of syntax of the bit stream, said second element of syntax being comprised in the header part 181 of the bit stream 180. The header part 181 is encoded in a lossless manner.

FIG. 19 shows a block diagram of a first embodiment of a device for encoding an image of a sequence of images by motion compensating an input image responsive to the image to be encoded. Modules of the device of FIG. 19 implements the steps of the method of FIG. 24.

Only functional modules of the device in relation with a temporal prediction based coding (i.e. INTER coding) are shown on FIG. 19. The other modules, not shown, which are well-known in prior art, implement for example an INTRA coding with or without spatial prediction.

An image I1 to be encoded is taken as input by a module 191 which extracts, for instance on a pixel base, a prediction image Ip from the current image I1 to generate a residual image Ir. A module 192 transforms and quantifies the residual image Ir. The transform T is, for example, a Discrete Cosine Transform (DCT), a block-based transform or a wavelet-based transform. A module 193 implements the inverse operations: inverse quantization IQ followed by an inverse transform IT. A module 194 merges, for example on a pixel base, the image outputting module 193 and the prediction image Ip to generate a reconstructed (alias decoded) image which is stored in a memory (module 195) that is a decoded picture buffer (DPB). Module 193 generates and stores in the memory (module 195) images I2 which may be used as reference input images for a temporal prediction module. A module 196 takes a reference input images I2 stored in the memory 195 and the global rotation motion parameters (the angles of the front direction) as input. The apparent motion of each pixel of the current image is calculated by a further module 197 according to the reference input I2 on which a global rotation motion is first applied. The current image to encode I1 is associated with the global rotation motion parameters (GRM parameters) $(\alpha(t),\beta(t),\gamma(t))$ and m(x,y) a pixel in this picture. The reconstructed image I2 from the Decoded Picture Buffer (module 195) GRM parameters $(\alpha(t'),\beta(t'),\gamma(t'))$ and n(x',y') is a pixel in this picture. A globally motion compensated picture of reference is reconstructed by applying a motion compensation for each pixel of I1 to obtain the corresponding pixel in I2 as: $(x, y) \rightarrow (x', y')$. Coordinates (x',y') are calculated by applying a global rotation motion compensation. A point $M_{t'}$ is calculated. $M_{t'}$ corresponds to the projection of the pixel m(x,y) expressed in the frame of reference of image I1 at the instant t to the frame of reference of the image I1 at the instant t'. The equation [eq. 3] operates an axis system change transform.

$$M_{t'} = R_{t'} R_t^{-1}(\text{Proj}^{-1}(f(m(x,y))))  \qquad [\text{eq. 3}]$$

Where function $f$ and Proj are functions defined according to the mapping of the images I1 and I2; $R_t$ is the rotation matrix calculated according to GRM parameters $(\alpha(t),\beta(t),\gamma(t))$; and $R_{t'}$ is the rotation matrix calculated according to GRM parameters $(\alpha(t'),\beta(t'),\gamma(t'))$. The pixel n(x',y') is calculated by projecting the point $M_{t'}$ in the reference input image I2 according to equation [eq. 4].

$$n(x',y') = f^{-1}(\text{Proj}(M_{t'}))  \qquad [\text{eq. 4}]$$

$$(x',y') = f^{-1}(\text{Proj}(R_{t'} R_t^{-1} \text{Proj}^{-1}(f(m(x,y)))))  \qquad [\text{eq. 5}]$$

The equation [eq. 5] expresses the global rotation motion compensation at once. In a variant of the embodiment of FIG. 19, images I1 and I2 are encoded according to an equirectangular mapping as illustrated by images 131 of FIG. 13 and 141 of FIG. 14. An equirectangular mapping defines the functions $f$ and Proj as following:

$$f: M(x, y) \rightarrow M'(\theta, \varphi), \theta = 2\pi x, \varphi = \pi y$$

$$f^{-1}: M'(\theta, \varphi) \rightarrow M(x, y), x = \frac{\theta}{2\pi}, y = \frac{\varphi}{\pi}$$

$$\text{Proj}: M \rightarrow M'$$

$$\text{Proj}^{-1}: M' \rightarrow M$$

$$\theta = \operatorname{atan}\left(\frac{Y}{X}\right) + \pi$$

$$M = \begin{bmatrix} \sin\left(\varphi - \frac{\pi}{2}\right)\cos(\theta) \\ \sin\left(\varphi - \frac{\pi}{2}\right)\sin(\theta) \\ \cos\left(\varphi - \frac{\pi}{2}\right) \end{bmatrix}$$

$$\varphi = -\operatorname{atan}\left(\frac{\sqrt{X^2 + Y^2}}{Z}\right) + \frac{\pi}{2}$$

In a variant of the embodiment of the device illustrated on FIG. 19, the images I1 and I2 are encoded according a cube mapping with a the layout 134 of FIG. 13 as illustrated by images 133 of FIG. 13 and 143 of FIG. 14. In this case, the functions $f$ and Proj are defined as following:

$$f: M(x, y) \rightarrow M'(u, v, k)$$

$$f \begin{cases} \text{Left}: x < w, y > h : u = \frac{2x}{w} - 1, v = \frac{2(y-h)}{2h} - 1, k = 0 \\ \text{front}: w < x < 2w, y > h : u = \frac{2(x-w)}{w} - 1, v = \frac{2(y-h)}{2h} - 1, k = 1 \\ \text{right}: 2w < x, y > h : u = \frac{2(x-2w)}{w} - 1, v = \frac{2(y-h)}{2h} - 1, k = 2 \\ \text{bottom}: x < w, y < h : u = \frac{2y}{h} - 1, v = \frac{2(w-x)}{2w} - 1, k = 3 \\ \text{back}: w < x < 2w, y < h : u = \frac{2y}{h} - 1, v = \frac{2(2w-x)}{2w} - 1, k = 4 \\ \text{top}: 2w < x, y < h : u = \frac{2y}{h} - 1, v = \frac{2(3w-x)}{2w} - 1, k = 5 \end{cases}$$

Where w is one third of the image width and h is the half of the image height. The inverse function $f^{-1}$ is straightforward from the above equations.

$$\text{Proj}^{-1}: M'(u, v, k) \rightarrow M^{3d}(X, Y, Z)$$

$$\text{Proj}^{-1} \begin{cases} \text{Left } (k = 0) : X = -1, & Y = u & Z = v \\ \text{front } (k = 1) : X = u & Y = 1 & Z = v \\ \text{right } (k = 2) : X = 1, & Y = -u & Z = v \\ \text{bottom } (k = 3) : X = -u & Y = v, & Z = -1 \\ \text{back } (k = 4) : X = u & Y = -1 & Z = v \\ \text{top } (k = 5) : X = u & Y = v & Z = -1 \end{cases}$$

The inverse function Proj is straightforward from above equations.

In a module 197 illustrated on FIG. 19, a motion compensation and a prediction are performed on the image I3 outputting the module 152. Module 196 estimates at least one motion vector between the image I1 to encode and the global rotation motion compensated reference image I3. According to a well-known process, the motion estimation searches in the reference image I3 a motion data, such as a motion vector, in order to minimize an error computed between pixels of the image to encode I1 and pixels of a reference image I3 or to minimize another metric like a rate-distortion cost. As the reference image I3 has been global rotation motion compensated by module 196, the search of motion data is facilitated. The image I1 is encoded as a predicted image Ip.

A module 198 entropy encodes the quantified data to a bit stream S of coded data. This module generates a stream as described in relation with FIG. 18. In a first element of syntax of the bit stream, element of syntax forming the payload part 182 of the bit stream 180, the module uses a usual CABAC (context-adaptive binary arithmetic coding) and stores entropy encoded data representative of the sequence of images. In a second element of syntax forming the header part 181 of the bit stream 180, the module encodes, among other data, the global rotation motion parameters associated with images' identifiers in a lossless manner.

FIG. 20 shows an embodiment of a device configured to decode a bit stream S encoded according to the first embodiment of the method 150 illustrated in FIG. 24. The bit stream S is representative of a sequence of images and comprises two elements of syntax as described in relation with FIGS. 18 and 19. Modules of the device of FIG. 20 implements the steps of the method of FIG. 25.

A module 201 implements a CABAC for entropy decoding residual data relative to coded sequence of images to decode and syntax elements required for reconstructing the decoded images such as coding mode, mapping used for encoding images, motion data or significant map for example. The module also extracts, associated with each image, global rotation motion parameters.

According to a variant, not shown on FIG. 20, decoding motion data comprises motion estimating. The decoded video data relative to image to be decoded are transmitted to a module 202 which applies an inverse quantization followed by an inverse transform. The module 202 is equivalent to the module 193 of the FIG. 19. Module 202 is linked to a module 203 which merges, for example on a pixel by pixel base, the residual image outputting the module 202 and a prediction image Ip to generate a decoded image I6 representative of the image to be decoded. The reconstructed image I6 is also stored in a memory 204.

A module 205 takes a reference input image I4 stored in the memory 204 and the global rotation motion parameters associated with this image I4 and the GRM parameters associated with the current image to decode as input. The apparent motion of each pixel of the current image is calculated by a further module 206 according to the reference input I4 on which a global rotation motion is first applied. A globally motion compensated picture of reference is reconstructed by applying a motion compensation for each pixel of I4 to obtain the corresponding pixel in I5 as: (x, y)→(x', y'). Coordinates (x',y') are calculated by applying a global rotation motion compensation as described in relation with module 196 of FIG. 19. Functions $f$, $f^1$, Proj and Proj$^{-1}$ are selected according to the mapping used for encoding images.

A motion compensation and a prediction are performed on the image I5 outputting module 205 by module 206. Module 206 estimates at least one motion vector between the image to decode and the global rotation motion compensated reference image I5. According to a well-known process, the motion estimation searches in the reference image I5 a motion data, such as a motion vector, in order to minimize an error computed between pixels of the image to decode and pixels of a reference image I5 or another metric like a rate-distortion cost. As the reference image I5 has been global rotation motion compensated by module 205, the search of motion data is facilitated. The image to decode is encoded as a predicted image Ip.

FIG. 21 shows a block diagram of a second embodiment of a device configured to encode an image of a sequence of images by motion compensating an input image responsive to the image to be encoded. Modules of the device of FIG. 21 implements the steps of the method of FIG. 26.

A module 211 is configured to obtain the image I1. Module 211 performs a global rotation motion compensation by applying the functions $f$, $f^1$, Proj and Proj$^{-1}$ as described in relation with FIG. 19 according to reference global rotation motion parameters, for instance the GRM parameters of the first image of a sequence or the GRM parameters of the last image coded only with intra-prediction, and the GRM parameters associated with the image I1 to encode. The image I1 is mapped according to the front direction of the image of reference. Pixel differences between the reference image and the GRM compensated image I3 outputting module 211 are due to apparent motion of the objects in the scene and no longer to the rotation of the front direction. The GRM compensated image I3 is motion compensated according to well-known method in prior art by a structure of modules 212 and entropy encoded by module 213. Module 213 entropy encodes the quantified data to a bit stream S of coded data. This module generates a stream as described in relation with FIG. 18. In a first element of syntax of the bit stream, element of syntax forming the payload part 182 of the bit stream 180, the module uses a usual CABAC (context-adaptive binary arithmetic coding) and stores entropy encoded data representative of the sequence of images. In a second element of syntax forming the header part 181 of the bit stream 180, the module encodes, among other data, the global rotation motion parameters associated with images' identifiers in a lossless manner.

FIG. 22 shows an embodiment of a device configured to decode a bit stream S encoded according to the second embodiment of the method 150 illustrated in FIG. 26. The bit stream S is representative of a sequence of images and comprises two elements of syntax as described in relation with FIGS. 18 and 21. Modules of the device of FIG. 22 implements the steps of the method of FIG. 27.

A module 221 uses a CABAC for entropy decoding residual data relative to the coded sequence of images to decode and syntax elements required for reconstructing the decoded images such as coding mode, mapping used for encoding images, motion data or significant map for example. The module also extracts global rotation motion parameters associated with each image. According to a variant, not shown on FIG. 20, decoding motion data comprises motion estimating. The decoded video data relative to the image to be decoded are transmitted to a module 222 which applies an inverse quantization followed by an inverse transform. The module 222 is equivalent to the module 193 of the FIG. 19. Module 222 is linked to a module 223 which merges, for example on a pixel by pixel basis, the residual image outputting the step 222 and a prediction image Ip to generate a decoded image I7 representative of the image to be decoded. The reconstructed image I7 is also stored in a memory 224. A motion compensation and a prediction are performed on the image outputting memory 224 by a module 225. A module 226 estimates at least one motion vector between the image to decode and the global rotation motion compensated reference image. According to a well-known process, the motion estimation searches in the reference image a motion data, such for instance a motion vector, in order to minimize an error computed between pixels of the image to decode and pixels of a reference image, or any other metric like a rate-distortion cost. As the reference image has been global rotation motion compensated by module 225, the search of motion data is facilitated. The image to decode is encoded as a predicted image Ip.

FIG. 23 shows a hardware embodiment of an apparatus 230 configured to implement methods described in relation with FIG. 15, 16, 17, 19, 20, 21 or 22. In this example, the device 230 comprises the following elements, connected to each other by a bus 231 of addresses and data that also transports a clock signal:
  a microprocessor 232 (or CPU), which is, for example, a DSP (or Digital Signal Processor);
  a non-volatile memory of ROM (Read Only Memory) type 233;
  a Random Access Memory or RAM (234);
  an I/O interface 235 for reception of data to transmit, from an application; and
  a graphics card 236 which may embed registers of random access memory;
  a power source 237.

In accordance with an example, the power source 237 is external to the device. In each of mentioned memory, the word «register» used in the specification may correspond to area of small capacity (some bits) or to very large area (e.g. a whole program or large amount of received or decoded data). The ROM 233 comprises at least a program and parameters. The ROM 233 may store algorithms and instructions to perform techniques in accordance with present principles. When switched on, the CPU 232 uploads the program in the RAM and executes the corresponding instructions.

RAM 234 comprises, in a register, the program executed by the CPU 232 and uploaded after switch on of the device 230, input data in a register, intermediate data in different states of the method in a register, and other variables used for the execution of the method in a register.

The implementations described herein may be implemented in, for example, a module of one of the methods 150, 160 or 170 or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware which may be one of the components of the systems described in FIGS. 2 to 12. The methods and their modules may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), set-top-boxes and other devices that facilitate communication of information between end-users, for instance the components of the systems described in FIGS. 2 to 12.

In accordance with an example of encoding an image of a sequence images by motion compensating an input image responsive to the image to be encoded as illustrated on FIGS. 15, 19 and 21, a bit stream representative of a sequence of images is obtained from a source. For example, the source belongs to a set comprising:
  a local memory (233, 234 or 236), e.g. a video memory or a RAM (or Random Access Memory), a flash memory, a ROM (or Read Only Memory), a hard disk;
  a storage interface (235), e.g. an interface with a mass storage, a RAM, a flash memory, a ROM, an optical disc or a magnetic support; and
  a communication interface (235), e.g. a wireline interface (for example a bus interface, a wide area network interface, a local area network interface) or a wireless interface (such as a IEEE 802.11 interface or a Bluetooth® interface).

According to one particular embodiment, the algorithms implementing the steps of a method 150 of encoding an image of a sequence images by motion compensating an input image responsive to the image to be encoded are stored in a memory GRAM of the graphics card 236 associated with the device 230 implementing these steps. According to a variant, a part of the RAM (234) is assigned by the CPU (232) for storage of the algorithms. These steps lead to the generation of a video stream that is sent to a destination belonging to a set comprising a local memory, e.g. a video memory (234), a RAM (234), a ROM (233), a flash memory (233) or a hard disk (233), a storage interface (235), e.g. an interface with a mass storage, a RAM, a ROM, a flash memory, an optical disc or a magnetic support and/or received from a communication interface (235), e.g. an interface to a point to point link, a bus, a point to multipoint link or a broadcast network.

In accordance with an example of decoding an image of a sequence of images by motion compensating an input image responsive to the image to be decoded, a stream representative of a sequence of images is obtained from a source. Exemplarily, the bit stream is read from a local memory, e.g. a video memory (234), a RAM (234), a ROM (233), a flash memory (233) or a hard disk (233). In a variant, the stream is received from a storage interface (235), e.g. an interface with a mass storage, a RAM, a ROM, a flash memory, an optical disc or a magnetic support and/or received from a communication interface (235), e.g. an interface to a point to point link, a bus, a point to multipoint link or a broadcast network.

According to one particular embodiment, the algorithms implementing the steps of a method of decoding an image of a sequence of images by motion compensating an input image responsive to the image to be decoded are stored in a memory GRAM of the graphics card 236 associated with the device 230 implementing these steps. According to a variant, a part of the RAM (234) is assigned by the CPU (232) for storage of the algorithms. These steps lead to the composition of a video that is sent to a destination belonging to a set comprising the components of systems described in FIGS. 2 to 12 such as, for instance:
  a mobile device;
  a communication device;
  a game device;

a set-top-box;
a TV set;
a tablet (or tablet computer);
a laptop;
a display and
a decoding chip.

Naturally, the present disclosure is not limited to the embodiments previously described.

In particular, the present disclosure is not limited to methods of encoding and decoding a sequence of images but also extends to any method of displaying the decoded video and to any device implementing this displaying method as, for example, the display devices of FIGS. 2 to 12. The implementation of calculations necessary to encode and decode the bit stream is not limited either to an implementation in shader type microprograms but also extends to an implementation in any program type, for example programs that can be executed by a CPU type microprocessor. The use of the methods of the present disclosure is not limited to a live utilisation but also extends to any other utilisation, for example for processing known as postproduction processing in a recording studio.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding an omnidirectional image in a stream according to a reference direction of an omnidirectional acquisition system in a 3D scene, the method comprising:

obtaining a first omnidirectional image by mapping the 3D scene onto an omnidirectional image plane according to a 3D to 2D mapping operator and a front direction of the omnidirectional acquisition system;

determining rotation parameters according to the 3D to 2D mapping operator and an angle between the front direction and the reference direction of the omnidirectional acquisition system;

applying a global rotation motion compensation according to the rotation parameters to a third omnidirectional image to obtain a second omnidirectional image, wherein the third omnidirectional image is one of (i) the first omnidirectional image and (ii) a reconstructed omnidirectional image obtained by summing a residual image responsive to the first omnidirectional image and a motion predicted image responsive to the first omnidirectional image;

generating the omnidirectional image by inputting the second omnidirectional image into a motion compensation module that uses residual data and motion vectors; and encoding the omnidirectional image and the rotation parameters in the stream.

2. The method of claim 1, further comprising:
generating a bit stream carrying data representative of a sequence of omnidirectional images, wherein the data comprises:
a first element of syntax representative of the omnidirectional images; and
a second element of syntax representative of the rotation parameters.

3. A method of decoding an omnidirectional image from a stream according to a reference direction of an omnidirectional acquisition system in a 3D scene, the method comprising:
obtaining a first omnidirectional image and rotation parameters from the stream, wherein the first omnidirectional image is representative of the 3D scene mapped onto an omnidirectional image plane according to a 3D to 2D mapping operator and a front direction of the omnidirectional acquisition system and wherein the rotation parameters are determined according to the 3D to 2D mapping operator and an angle between the front direction and the reference direction;
obtaining a second omnidirectional image by inputting the first omnidirectional image into a motion compensation module that uses residual data and motion vectors; and
applying a global rotation motion compensation according to the rotation parameters to a third omnidirectional image to obtain the omnidirectional image, wherein the third omnidirectional image is one of (i) the second omnidirectional image and (ii) a reconstructed omnidirectional image obtained by summing a residual image responsive to the second omnidirectional image and a motion predicted image responsive to the second omnidirectional image.

4. A device that encodes an omnidirectional image in a stream according to a reference direction of an omnidirectional acquisition system in a 3D scene, the device comprising a memory associated with at least a processor configured to:
obtain a first omnidirectional image by mapping the 3D scene onto an omnidirectional image plane according to a 3D to 2D mapping operator and a front direction of the omnidirectional acquisition system;
determine rotation parameters according to the 3D to 2D mapping operator and an angle between the front direction and the reference direction of the omnidirectional acquisition system;
apply a global rotation motion compensation according to the rotation parameters to a third omnidirectional image to obtain a second omnidirectional image, wherein the third omnidirectional image is one of (i) the first omnidirectional image and (ii) a reconstructed omnidirectional image obtained by summing a residual image responsive to the first omnidirectional image and a motion predicted image responsive to the first omnidirectional image;
generate the omnidirectional image by inputting the second omnidirectional image into a motion compensation module that uses residual data and motion vectors; and
encode the omnidirectional image and the rotation parameters in the stream.

5. A device that decodes an omnidirectional image from a stream according to a reference direction of an omnidirectional acquisition device in a 3D scene, the device comprising a memory associated with at least a processor configured to:
obtain a first omnidirectional image and rotation parameters from the stream, wherein the first omnidirectional image is representative of the 3D scene mapped onto an omnidirectional image plane according to a 3D to 2D mapping operator and a front direction of the omnidirectional acquisition device and wherein the rotation parameters are determined according to the 3D to 2D mapping operator and an angle between the front direction and the reference direction of the omnidirectional acquisition device;
obtain a second omnidirectional image by inputting the first omnidirectional image in a motion compensation module that uses residual data and motion vectors; and
apply a global rotation motion compensation according to the rotation parameters to a third omnidirectional image to obtain the omnidirectional image, wherein the third omnidirectional image is one of (i) the second omnidirectional image and (ii) a reconstructed omnidirectional image obtained by summing a residual image responsive to the second omnidirectional image and a motion predicted image responsive to the second omnidirectional image.

6. A non-transitory processor-readable medium having stored instructions that, when executed, cause a processor to:
obtain a first omnidirectional image by mapping a 3D scene onto an omnidirectional image plane according to a 3D to 2D mapping operator and a front direction of an omnidirectional acquisition system in the 3D scene;
determine rotation parameters according to the 3D to 2D mapping operator and an angle between the front direction and a reference direction of the omnidirectional acquisition system;
apply a global rotation motion compensation according to the rotation parameters to a third omnidirectional image to obtain a second omnidirectional image, wherein the third omnidirectional image is one of (i) the first omnidirectional image and (ii) a reconstructed omnidirectional image obtained by summing a residual image responsive to the first omnidirectional image and a motion predicted image responsive to the first omnidirectional image;
generate an omnidirectional image by inputting the second omnidirectional image in a motion compensation module that uses residual data and motion vectors; and
encode the omnidirectional image and the rotation parameters in the stream.

7. A system for immersive rendering of an omnidirectional image encoded into a bitstream, the system comprising:
a network interface configured to receive the bitstream from a data network;
a device that decodes the bitstream, wherein the device is configured to:
obtain a first omnidirectional image and rotation parameters from the stream, wherein the first omnidirectional image is representative of a 3D scene mapped onto an omnidirectional image plane according to a 3D to 2D mapping operator and a front direction of an omnidirectional acquisition device in the 3D scene and wherein the rotation parameters are determined according to the 3D to 2D mapping operator and an angle between the front direction and a reference direction of the omnidirectional acquisition device;

obtain a second omnidirectional image by inputting the first omnidirectional image in a motion compensation module that uses residual data and motion vectors; and apply a global rotation motion compensation according to the rotation parameters to a third omnidirectional image to obtain the omnidirectional image, wherein the third omnidirectional image is one of (i) the second omnidirectional image and (ii) a reconstructed omnidirectional image obtained by summing a residual image responsive to the second omnidirectional image and a motion predicted image responsive to the second omnidirectional image; and an immersive rendering device.

8. A non-transitory processor-readable medium having stored instructions that, when executed, cause a processor to:

obtain a first omnidirectional image and rotation parameters from a stream, wherein the first omnidirectional image is representative of a 3D scene mapped onto an omnidirectional image plane according to a 3D to 2D mapping operator and a front direction of an omnidirectional acquisition device in the 3D scene and wherein the rotation parameters are determined according to the 3D to 2D mapping operator and an angle between the front direction and a reference direction of the omnidirectional acquisition device;

obtain a second omnidirectional image by inputting the first omnidirectional image in a motion compensation module that uses residual data and motion vectors; and apply a global rotation motion compensation according to the rotation parameters to a third omnidirectional image to obtain an omnidirectional image, wherein the third omnidirectional image is one of (i) the second omnidirectional image and (ii) a reconstructed omnidirectional image obtained by summing a residual image responsive to the second omnidirectional image and a motion predicted image responsive to the second omnidirectional image.

* * * * *